United States Patent
Campanella et al.

(10) Patent No.: US 11,631,289 B2
(45) Date of Patent: Apr. 18, 2023

(54) VEHICLE AUDIO CAPTURE AND DIAGNOSTICS

(71) Applicant: ACV Auctions Inc., Buffalo, NY (US)

(72) Inventors: Charlie Campanella, Tonawanda, NY (US); Keith Carolus, Buffalo, NY (US); Reid Gershbein, Buffalo, NY (US); Daniel Magnuszewski, Amherst, NY (US); Michael Pokora, Buffalo, NY (US); Timothy Poulsen, Walworth, NY (US); Philip Schneider, Amherst, NY (US); Dennis Christopher Fedorishin, East Amherst, NY (US)

(73) Assignee: ACV Auctions Inc., Buffalo, NY (US)

( * ) Notice: Subject to any disclaimer, the term of this patent is extended or adjusted under 35 U.S.C. 154(b) by 323 days.

(21) Appl. No.: 16/749,585

(22) Filed: Jan. 22, 2020

(65) Prior Publication Data
US 2020/0234517 A1    Jul. 23, 2020

Related U.S. Application Data

(60) Provisional application No. 62/795,444, filed on Jan. 22, 2019.

(51) Int. Cl.
*G06F 7/00* (2006.01)
*G07C 5/08* (2006.01)
(Continued)

(52) U.S. Cl.
CPC ........... *G07C 5/0833* (2013.01); *G06F 9/541* (2013.01); *G06F 16/635* (2019.01); *G06F 16/65* (2019.01);
(Continued)

(58) Field of Classification Search
CPC ........ G06F 9/541; G06F 16/635; G06F 16/65; G06F 16/901; G06N 20/00; G06N 3/0454;
(Continued)

(56) References Cited

U.S. PATENT DOCUMENTS 5,854,993 A     12/1998  Grichnik
10,740,404 B1 *  8/2020  Hjermstad ............ G06F 16/909
(Continued)

FOREIGN PATENT DOCUMENTS

WO    2008/022289 A2    2/2008

OTHER PUBLICATIONS

International Search Report and Written Opinion for Application No. PCT/US2020/014645 dated May 22, 2020.
(Continued)

*Primary Examiner* — Mohammed R Uddin
(74) *Attorney, Agent, or Firm* — Wolf, Greenfield & Sacks, P.C.

(57) ABSTRACT

Methods and systems for capturing and processing audio data of a vehicle engine. In one aspect, a vehicle audio capture system includes a mobile device configured to capture vehicle engine sounds in an audio file and to associate tags identifying one or more vehicle conditions observed during audio capture and reflected in the audio file, and a server configured to process the audio file and expose an application programming interface (API) to provide access to the audio file to one or more data consumer devices. In some instances, a condition report server is configured to access the application programming interface to retrieve a version of the audio file and include data describing the audio file within a vehicle condition report. Additionally, tags may be added to the audio file based on
(Continued)

detected engine conditions. Detection of engine conditions may be based on use of trained models.

22 Claims, 25 Drawing Sheets

(51) Int. Cl.
| | |
|---|---|
| *G07C 5/00* | (2006.01) |
| *G06F 16/65* | (2019.01) |
| *G06F 9/54* | (2006.01) |
| *G06F 16/901* | (2019.01) |
| *G06N 20/00* | (2019.01) |
| *G06F 16/635* | (2019.01) |

(52) U.S. Cl.
CPC .......... *G06F 16/901* (2019.01); *G06N 20/00* (2019.01); *G07C 5/006* (2013.01)

(58) Field of Classification Search
CPC ........ G06N 5/003; G06N 7/005; G06N 20/10; G06N 3/08; G06Q 50/30; G07C 5/0808; G07C 5/0833; G10L 19/26
See application file for complete search history.

(56) References Cited

U.S. PATENT DOCUMENTS

| | | | |
|---|---|---|---|
| 11,157,835 B1* | 10/2021 | Hjermstad | G06N 20/00 |
| 2004/0176879 A1* | 9/2004 | Menon | F02C 9/00 |
| | | | 701/1 |
| 2005/0149234 A1 | 7/2005 | Vian et al. | |
| 2005/0169484 A1* | 8/2005 | Cascone | G10K 15/02 |
| | | | 340/384.3 |
| 2005/0192722 A1* | 9/2005 | Noguchi | G07C 5/0808 |
| | | | 701/33.4 |
| 2012/0323531 A1 | 12/2012 | Pascu et al. | |
| 2013/0277529 A1* | 10/2013 | Bolliger | F16M 11/10 |
| | | | 248/676 |
| 2014/0162219 A1* | 6/2014 | Stankoulov | G09B 19/167 |
| | | | 434/65 |
| 2014/0201126 A1* | 7/2014 | Zadeh | A61B 5/165 |
| | | | 706/52 |
| 2015/0019533 A1* | 1/2015 | Moody | G06Q 50/265 |
| | | | 707/722 |
| 2015/0100448 A1 | 4/2015 | Binion et al. | |
| 2015/0333789 A1* | 11/2015 | An | H04B 1/3822 |
| | | | 455/575.9 |
| 2016/0025027 A1* | 1/2016 | Mentele | F02D 41/22 |
| | | | 701/102 |
| 2016/0034590 A1* | 2/2016 | Endras | G06Q 30/08 |
| | | | 707/770 |
| 2016/0036899 A1* | 2/2016 | Moody | H04L 67/10 |
| | | | 709/217 |
| 2016/0112216 A1* | 4/2016 | Sargent | G07C 5/0808 |
| | | | 370/328 |
| 2016/0342945 A1* | 11/2016 | Doranth | H04L 63/0861 |
| 2017/0169399 A1* | 6/2017 | Areshidze | G06Q 30/0283 |
| 2017/0356936 A1* | 12/2017 | Ismail | G01R 19/0053 |
| 2017/0364776 A1* | 12/2017 | Micks | G06V 30/194 |
| 2018/0005463 A1* | 1/2018 | Siegel | G05B 23/0221 |
| 2018/0025392 A1* | 1/2018 | Helstab | G06Q 10/10 |
| | | | 705/306 |
| 2018/0150805 A1* | 5/2018 | Shaver | G06Q 10/20 |
| 2018/0350167 A1* | 12/2018 | Ekkizogloy | G08G 1/0968 |
| 2019/0017487 A1* | 1/2019 | Rudnitzki | F02D 41/009 |
| 2019/0228596 A1* | 7/2019 | Mondello | G06F 16/2457 |
| 2019/0287079 A1* | 9/2019 | Shiraishi | G07C 5/0841 |
| 2019/0294878 A1* | 9/2019 | Endras | G06T 7/0004 |
| 2020/0057487 A1* | 2/2020 | Sicconi | G06N 20/00 |

OTHER PUBLICATIONS

International Preliminary Report on Patentability for International Application No. PCT/US2020/014645 dated Aug. 5, 2021.
Extended European Search Report for European Application No. 20745586.6 dated Dec. 12, 2022.

* cited by examiner

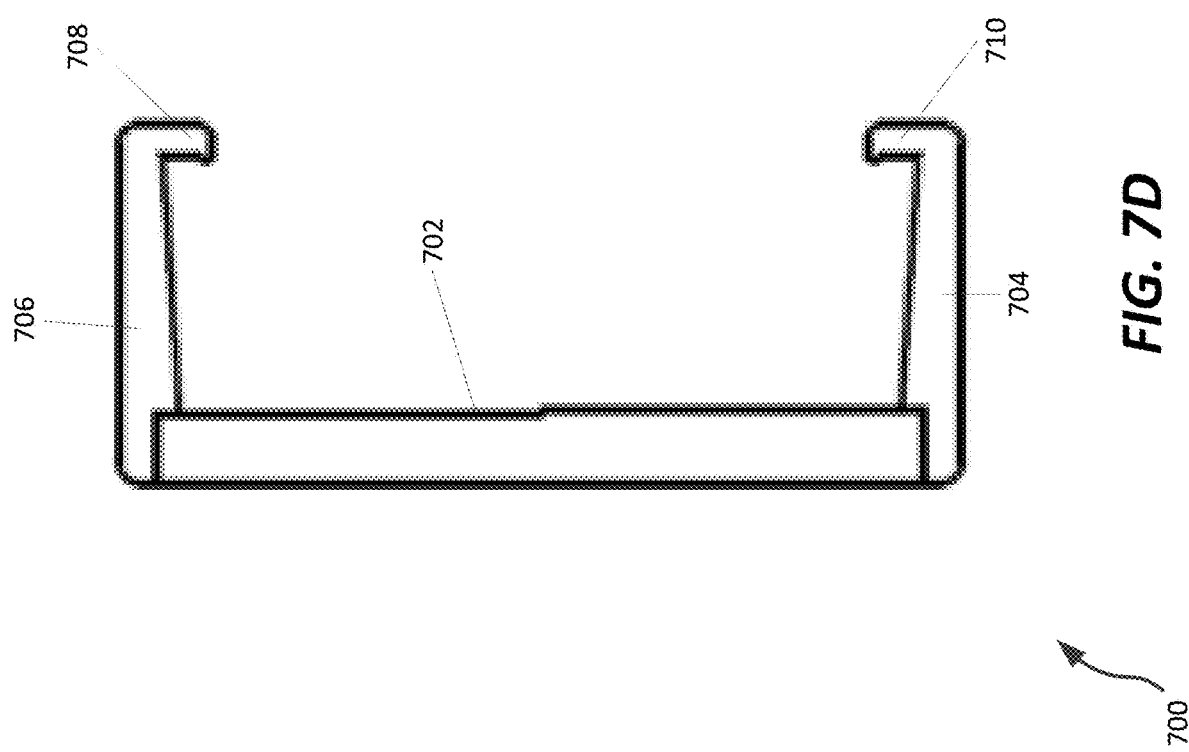

Vehicle Report

| | |
|---|---|
| Vehicle Model: Toyota | Vehicle Make: Camry |
| Vehicle Year: 2017 | Vehicle Type: Sedan 4-Door |
| Trim: XLE | Engine: V6 |
| VIN: 999999999999 | Miles: 40,000 |

Images

Audio Motor Profile (AMP™)

▶ ──────●────── 00:15 🔊 ●

⚠ Engine Abnormality Detected
- Difficult Start
- Engine Misfire
- Ticking Noise

VIEW DETAILED ANALYSIS

VEHICLE AUDIO CAPTURE AND DIAGNOSTICS

CROSS-REFERENCE TO RELATED APPLICATIONS

The present application claims priority from U.S. Provisional Patent Application No. 62/795,444, filed on Jan. 22, 2019, the disclosure of which is incorporated by reference in its entirety.

TECHNICAL FIELD

This invention relates to the field of vehicle diagnostics. More particularly, this invention relates to the capture and processing of vehicle engine audio.

BACKGROUND

Vehicles are often bought and sold in the wholesale market by automobile dealers. Vehicle buying and selling transactions may occur in-person or online in a virtual sales environment, and may also occur at auctions, either in-person or online over the internet. Because of the volume of vehicles sold at auction, often it is not possible for a dealer, acting as either a wholesale buyer or wholesale seller, to inspect a vehicle in-person, much less have the vehicle inspected by a qualified mechanic. Dealers often rely on auction houses or third party inspection services to provide vehicle condition data upon which purchasing decisions may be made. This vehicle condition data is often provided to dealers as a written report in electronic form.

The value of a vehicle condition report is based, in large part, on the accuracy and completeness of the data it contains. However, even perfect vehicle condition reports may lack data necessary to provide an accurate assessment of a vehicle's condition. For example, vehicle features such as how the engine sounds during start, idle, and revving are not currently captured, in a written report or otherwise, even if such features are observed, e.g. at an in-person auction. The same is true in a retail environment, where vehicle data is often presented online in a website as a written description and a set of images of the exterior and interior of the vehicle, but lacking vehicle features such as how the engine sounds. Therefore, there is a need for improvements in the capture and processing of vehicle condition data provided to dealers in wholesale automobiles. The need for improvements in the capture and processing of vehicle condition data extends to the retail market for automobiles as well.

SUMMARY

In general terms, this disclosure is directed towards assessment of the condition of vehicles. This disclosure relates generally to systems and methods for providing useful engine diagnostics, and in particular to capturing and evaluating vehicle engine audio.

In a first aspect, a vehicle audio capture system includes a mobile device configured to capture vehicle engine sounds in an audio file and to associate tags identifying one or more vehicle conditions observed during audio capture and reflected in the audio file, and a server configured to process the audio file and expose an application programming interface (API) to provide access to the audio file to one or more data consumer devices. In some instances, a condition report server is configured to access the application programming interface to retrieve a version of the audio file and include data describing the audio file within a vehicle condition report.

In another embodiment, a method of capturing and processing audio is described. The method includes receiving vehicle identification information, and placing a mobile device configured to capture audio in a digital format and including at least one microphone in proximity to a vehicle. The method further includes initiating audio capture using the mobile device and microphone, starting the vehicle engine while the mobile device is capturing audio, idling the engine while the mobile device is capturing audio, and stopping the engine. The method further includes ending audio capture and storing the digitally captured audio in an audio file, tagging the audio file with information related to conditions during audio capture, adding the vehicle identification information to the audio file, and uploading the audio file to remote computing device for processing the audio file.

In a still further aspect, a method of predicting conditions of a vehicle engine is disclosed. The method includes receiving an audio file recording of the vehicle engine, and receiving vehicle identification information of a vehicle associated with the vehicle engine. The method further includes deriving one or more tags identifying vehicle conditions observed in the audio file using one more models trained on audio files associated with other vehicles, and generating one or more predicted condition tags associated with the audio file.

In a further aspect, a server computing device for providing vehicle condition reports is disclosed. The server computing device includes a processor and a memory operatively connected to the processor. The memory stores instructions that cause the server computing device to: receive training audio files of recordings of vehicle engines, the training audio files including an audio recording of at least one known engine condition; train one or more models to predict the known engine condition using the received audio files and the at least one known engine condition, thereby creating one or more trained models; receive an audio file of a recording of a vehicle engine and vehicle identification information of the vehicle associated with the vehicle engine; and perform pre-processing of the audio file, the pre-processing including one or more of: normalizing length, volume or amplitude of an audio signal included in the audio file; and filtering noise from the audio file. The instructions further cause the server computing device to select a trained model from among the one or more trained models based, at least in part, on the vehicle identification information; obtain one or more predicted condition tags and associated confidence values based on output of the model; and generate a vehicle condition report including a representation of the audio file and at least one of the one or more predicted condition tags.

Corresponding reference characters indicate corresponding parts throughout the several views. The exemplifications set out herein illustrate an embodiment of the invention, and such exemplifications are not to be construed as limiting the scope of the invention in any manner.

BRIEF DESCRIPTION OF THE DRAWINGS

The present disclosure will be described hereafter with reference to the attached drawings which are given as non-limiting examples only, in which:

FIG. 7D is a perspective side view of an example clip, according to an example embodiment of the present disclosure.

DETAILED DESCRIPTION

Figure 1:
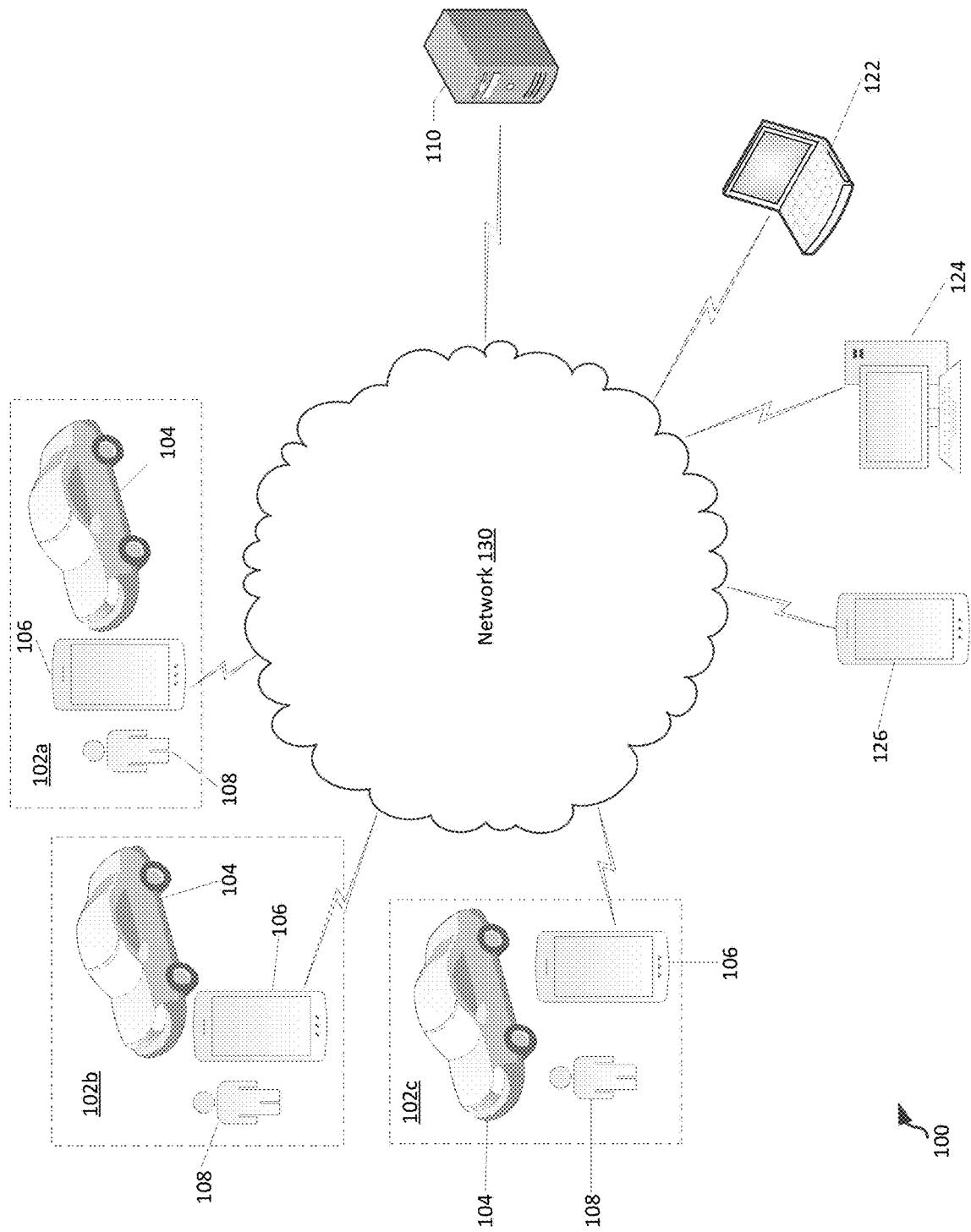
FIG. 1 shows an engine audio capture and diagnostics system, in accordance with some embodiments of the present disclosure.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

This disclosure relates generally to assessment of the condition of a vehicle. An important aspect of a vehicle's condition is the condition of the vehicle's engine. Many aspects of an engine may be determined from the sound of the engine when the engine is started, while the engine is idling, and while the engine is "revved" by applying a throttle and load. Audio data captured during engine start, idle, and revving can serve as a unique signature of the relative health of a particular vehicle's engine, especially as profiled over time for degradation due to mechanical wear and failure, and also as compared to the engines of other vehicles of the same make, model, year, and engine configuration, e.g. number of cylinders, cylinder volume, and the like. Captured audio data includes audio features indicative of vehicle conditions such as throttle position, combustion, cylinder sequence, RPM-tachometer reading, engine misfire, stutter, air to gas ratio, as well as other conditions which may be indicative of engine performance loss. A unique engine profile, or "engine fingerprint," may be generated based on the audio data and associated conditions and parameters during audio data capture, preliminary tags that a user assigns to the captured audio file based on environmental conditions and user observations during audio data capture, and other diagnostic information, e.g. OBD II data from the vehicle's computer, maintenance records, and third party reporting systems. The unique engine profile may be based on a data set, e.g. audio data, preliminary tags, and other diagnostic information, taken as a "snapshot in time," or may be based on multiple data sets each taken at different times over a period of time.

Vehicle condition data, for example data included in vehicle condition reports in the wholesale or retail automobile market, may be improved by including engine audio data. In some embodiments of this disclosure, the engine audio data may be in the form of an electronic sound file which the consumer of the report, for example a wholesale dealer, may play and listen to on an electronic device configured to play the electronic sound file. In other embodiments, the engine audio data may be processed and a visual representation of the engine audio may be generated. In still other embodiments, certain audio features correlated with vehicle engine condition may be automatically determined from the engine audio. In still further embodiments, vehicle engine conditions determined automatically from engine audio data may be combined with related repair costs and arbitration costs to determine the cost to repair or arbitrate the vehicle, adjust the value of the vehicle, or to assign market value to the vehicle relative to vehicles of similar type, e.g. make, model, year, engine configuration, options, etc.

FIG. 1 shows an engine audio capture and diagnostics system 100, in accordance with some embodiments of the present disclosure. The system 100 includes locations 102a, 102b, and 102c, server 110, data consumer devices 122, 124, and 126, and network 130.

In the example shown, locations 102a-c may be remote from each other, or may be proximate to each other, for example, all contained within a particular parking lot. Each of locations 102a-c can include a vehicle 104, a user 108, and a mobile device 106. In some embodiments, the mobile device 106 and user 108 may be the same in all locations 102a-c, for example, the same user 108 with the same mobile device 106 may travel to locations 102a-c within the same parking lot. In other embodiments, the user 108 and mobile device 106 may be different in each of locations 102a-c, for example, locations 102a-c may be in different states, or even different countries. Similarly, in some embodiments the vehicle 104 may be the same in all three of the locations 102a-c, for example for multiple audio captures of the same vehicle, or same type of vehicle (e.g., same make, model, engine type/size, trim, etc.). In some embodiments, the vehicle 104 may be different in each of locations 102a-c (e.g., a different make, model, engine type/size, trim, etc.). It is noted that the example shows three locations, however, other numbers of locations are within the scope of this disclosure, for example, one, two, four, or more locations.

In the example shown, the mobile device 106 may be a computing device such as computing device 300 described in connection with FIG. 3 below. In the example shown, the mobile device 106 has application software configured to capture and store an electronic audio file along with data entered by the user 108. The mobile device 106 includes a microphone with which to capture audio, and electronics that convert audio captured by the microphone into an electronic sound file. In some embodiments, the mobile device 106 is connected to an external microphone which captures audio. The mobile device 106 is placed near enough to vehicle 104 in order to capture audio of the vehicle engine. For example, mobile device 106 is placed anywhere from which auditory frequencies from the vehicle engine can be derived. In some embodiments, the mobile device 106 (or at least a microphone portion associated with the mobile device 106) is placed on the vehicle 104, for example, the hood of the vehicle 104 is raised and the mobile device 106 is placed directly on the engine. Other placements are possible as well.

In the example shown, the vehicle 104 may be any vehicle having an engine. In some embodiments, the vehicle 104 is an automobile with an internal combustion engine. In other embodiments, the vehicle 104 has a hybrid (gas/electric) engine arrangement, an electric engine, or any other type of engine that produces an acoustic response that can be captured and analyzed Accordingly, although discussed in the context of automobiles, other types of vehicles (e.g., boats, motorcycles, or off-road vehicles) could be analyzed as well.

In the example shown, the locations 102a-c are separated from the server 110 and data consumer devices 122, 124, and 126 by a network 130. Network 130 can, in some cases, represent an at least partially public network such as the Internet. Data consumer devices 122, 124, and 126 include computing devices which are configured to download or access processed audio data provided by server 110. In some embodiments, data consumer devices 122, 124, and 126 may download or access vehicle condition reports that include processed audio data. In some embodiments, the processed audio data within vehicle condition reports downloaded or accessed by data consumer devices 122, 124, and 126 may be a visual representation of the captured audio data. In some other embodiments, the processed audio data within vehicle condition reports downloaded or accessed by data consumer devices 122, 124, and 126 may be a sound file, or a link to a sound file, for playback on data consumer devices 122, 124, and 126.

In the example shown, the server 110 can represent an audio data processing server, as well as one or more additional servers. For example, the server 110 and can also represent a condition report server that requests and receives audio data from an audio data processing server via an API exposed by the audio data processing server. In some embodiments, audio data processing and condition reports may be provided by the same server device.

Figure 2:
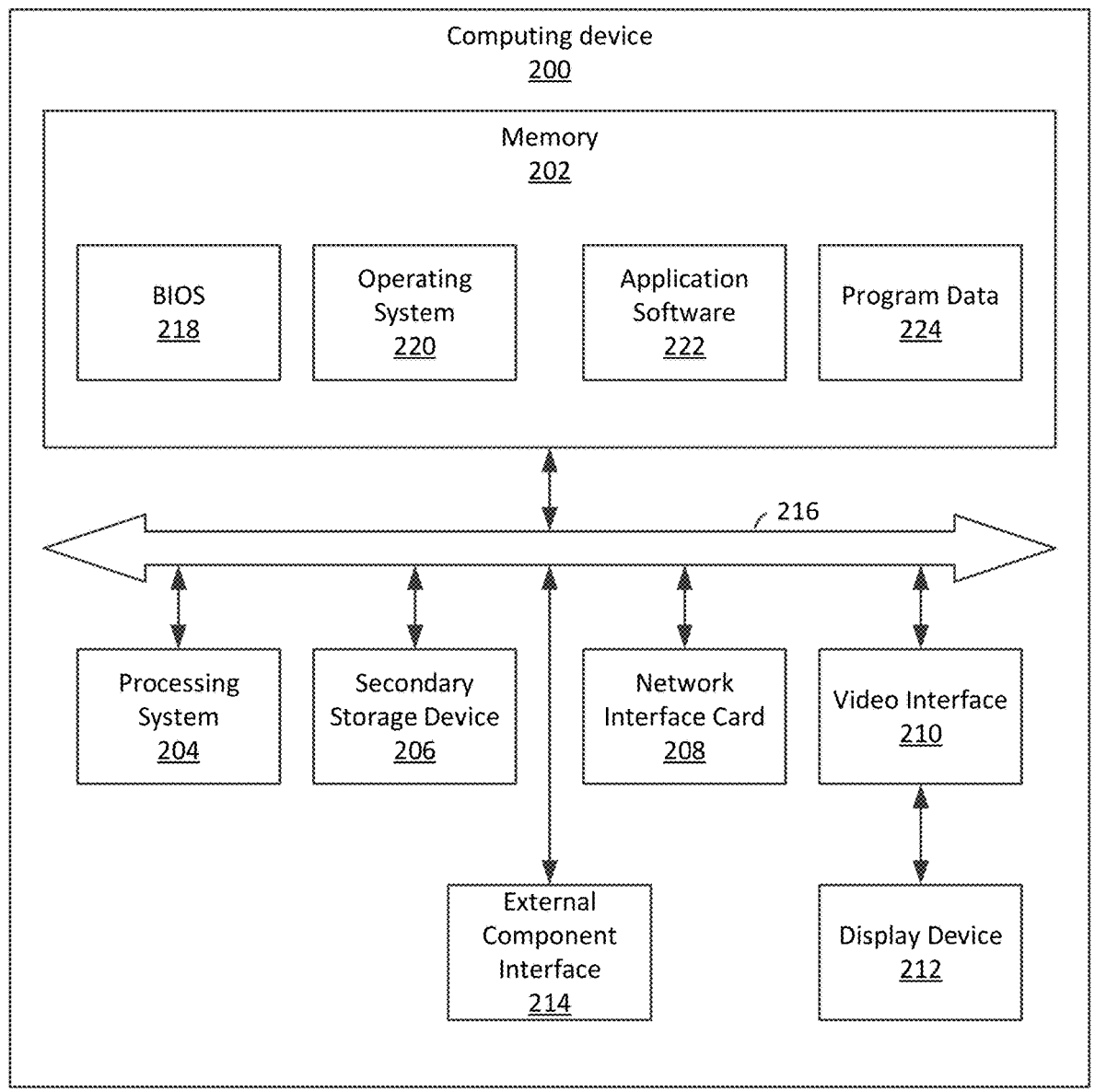
FIG. 2 shows a schematic illustration of an example discrete computing device in which aspects of the present disclosure can be implemented.

Referring now to FIG. 2, a schematic illustration of an example discrete computing system in which aspects of the present disclosure can be implemented. The computing device 200 can represent, for example, a native computing system within which server 110 can be implemented, or an implementation of the mobile devices 106, or data consumer devices 122, 124, or 126. In particular, the computing device 200 represents the physical construct of an example computing system at which a mobile device or server could be established. In some embodiments, the computing device 200 implements virtualized or hosted systems, and executes one particular instruction set architecture while being used to execute non-native software and/or translate non-native code streams in an adaptive manner, for execution in accordance with the methods and systems described herein.

In the example of FIG. 2, the computing device 200 includes a memory 202, a processing system 204, a secondary storage device 206, a network interface card 208, a video interface 210, a display unit 212, an external component interface 214, and a communication medium 216. The memory 202 includes one or more computer storage media capable of storing data and/or instructions. In different embodiments, the memory 202 is implemented in different ways. For example, the memory 202 can be implemented using various types of computer storage media.

The processing system 204 includes one or more processing units. A processing unit is a physical device or article of manufacture comprising one or more integrated circuits that selectively execute software instructions. In various embodiments, the processing system 204 is implemented in various ways. For example, the processing system 204 can be implemented as one or more physical or logical processing cores. In another example, the processing system 204 can include one or more separate microprocessors. In yet another example embodiment, the processing system 204 can include an application-specific integrated circuit (ASIC) that provides specific functionality. In yet another example, the processing system 204 provides specific functionality by using an ASIC and by executing computer-executable instructions.

The secondary storage device 206 includes one or more computer storage media. The secondary storage device 206 stores data and software instructions not directly accessible by the processing system 204. In other words, the processing system 204 performs an I/O operation to retrieve data and/or software instructions from the secondary storage device 206. In various embodiments, the secondary storage device 206 includes various types of computer storage media. For example, the secondary storage device 206 can include one or more magnetic disks, magnetic tape drives, optical discs, solid state memory devices, and/or other types of computer storage media.

The network interface card 208 enables the computing device 200 to send data to and receive data from a communication network. In different embodiments, the network interface card 208 is implemented in different ways. For example, the network interface card 208 can be implemented as an Ethernet interface, a token-ring network interface, a fiber optic network interface, a wireless network interface (e.g., WiFi, WiMax, etc.), or another type of network interface.

The video interface 210 enables the computing device 200 to output video information to the display unit 212. The display unit 212 can be various types of devices for displaying video information, such as an LCD display panel, a plasma screen display panel, a touch-sensitive display panel, an LED screen, a cathode-ray tube display, or a projector. The video interface 210 can communicate with the display unit 212 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 214 enables the computing device 200 to communicate with external devices. For example, the external component interface 214 can be a USB interface, a FireWire interface, a serial port interface, a parallel port interface, a PS/2 interface, and/or another type of interface that enables the computing device 200 to communicate with external devices. In various embodiments, the external component interface 214 enables the computing device 200 to communicate with various external components, such as external storage devices, input devices, speakers, modems, media player docks, other computing devices, scanners, digital cameras, and fingerprint readers.

The communication medium 216 facilitates communication among the hardware components of the computing device 200. In the example of FIG. 2, the communications medium 216 facilitates communication among the memory 202, the processing system 204, the secondary storage device 206, the network interface card 208, the video interface 210, and the external component interface 214. The communications medium 216 can be implemented in various ways. For example, the communications medium 216 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing System Interface (SCSI) interface, or another type of communications medium.

The memory 202 stores various types of data and/or software instructions. For instance, in the example of FIG. 2, the memory 202 stores a Basic Input/Output System (BIOS) 218 and an operating system 220. The BIOS 218 includes a set of computer-executable instructions that, when executed by the processing system 204, cause the computing device 200 to boot up. The operating system 220 includes a set of computer-executable instructions that, when executed by the processing system 204, cause the computing device 200 to provide an operating system that coordinates the activities and sharing of resources of the computing device 200. Furthermore, the memory 202 stores application software 222. The application software 222 includes computer-executable instructions, that when executed by the processing system 204, cause the computing device 200 to provide one or more applications. The memory 202 also stores program data 224. The program data 224 is data used by programs that execute on the computing device 200.

Although particular features are discussed herein as included within a computing device 200, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer storage media does not include, e.g., solely a carrier wave or other propagated or modulated data signal. In some embodiments, the computer storage media includes at least some tangible features; in many embodiments, the computer storage media includes entirely non-transitory components.

Figure 3:
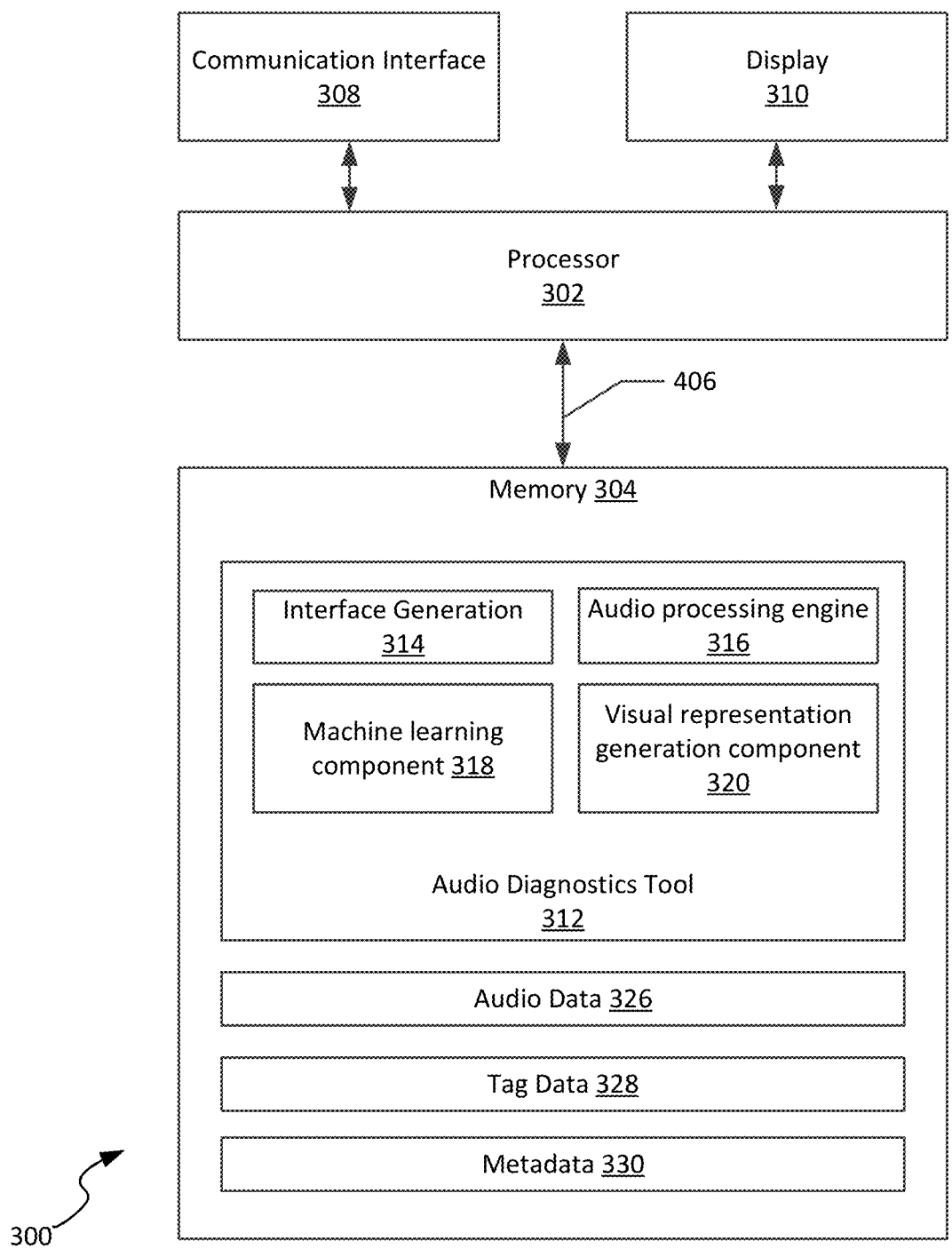
FIG. 3 is a schematic illustration of an example computing system useable to process captured audio, according to an example embodiment of the present disclosure.

FIG. 3 is a schematic illustration of an example computing system 300 useable to process captured audio, according to an example embodiment of the present disclosure. In general, the computing system 300 includes a processor 302 communicatively connected to a memory 304 via a data bus 306. The processor 302 can be any of a variety of types of programmable circuits capable of executing computer-readable instructions to perform various tasks, such as mathematical and communication tasks. The memory 304 can include any of a variety of memory devices, such as using various types of computer-readable or computer storage media, as also discussed above. In the embodiment shown, the memory 304 stores an audio diagnostics tool 312, discussed in further detail below. The computing system 300 can also include a communication interface 308 configured to receive and transmit data, for example to access data in an external database, or to serve a web interface useable to process audio data. Additionally, a display 310 can be used for viewing a local version of a user interface, as described herein, via an audio diagnostics tool 312.

In various embodiments, the audio diagnostics tool 312 generally is configured to generate an interface to automatically process audio data and provide processed audio data results. In the example embodiment shown, the audio diagnostics tool 312 includes an interface generation component 314, an audio processing engine 316, a machine learning component 318, and a visual representation component 320. The memory 304 can include audio data 326, which can include captured engine audio data including other associated data such as metadata, as well as other information, for any number of vehicles. The memory 304 may also include tag data 328, which can include user input tags associated with the audio data 326. Examples of tags are described below in connection with FIG. 5. The memory 304 may also include metadata 330, which can include data associated with the audio files such as audio capture settings, e.g. number of audio channels, number of frames, sampling rate, date and time of audio capture, type of digital format, and vehicle information such as vehicle identification, information from the vehicle computer, and vehicle information from third party reporting systems, as well as other information, for any number of vehicles.

In example embodiments, the interface generation component 314 can be configured to generate and serve an audio diagnostics user interface. The audio diagnostics user interface presents to a user software controls for downloading audio data, manipulating audio data processing settings, initiating audio data processing, and obtaining results from audio data processing.

In the example shown, the audio processing engine 316 is configured to generate a digital summary, e.g. a digital "fingerprint," for a given audio data file, such as an audio file captured in WAV audio file format. Other file formats such as AIFF, AU, PCM, FLAC, WavPack, TTA, ATRAC, ALAC, MPEF-4 WMA, Opus, MP3, Opus, Vorbis, and any other digital file format may be used. The digital summary includes audio capture information such as the number of channels, the number of frames, the sampling rate, and a unique audio object identifier and storage location of the original audio digital file.

In the example shown, the machine learning component 318 is configured to extract features from captured digital audio. In some embodiments, the machine learning component 318 uses deep convolutional neural networks (DCNN) trained to extract features from audio and perform some classification task. These features may be included within audio data representations of various types. In example embodiments, an audio file or various graphical representations of such an audio file could be used, such as a time domain waveform, spectrogram, Mel spectrogram, Mel-frequency cepstral coefficients (MFCCs) spectrogram, chromagram, etc. Examples of features include ambient noise recorded before engine start, engine start, engine idling, engine under load (e.g., an engine "rev" or similar action), and engine shut off. Other features may include abnormalities during the periods of time encompassed by any of the engine start, engine idling, engine rev or load, and engine shut off events. In particular, audio samples of correctly-operating engines during engine operating segments (e.g., start, idle, load, shut off) may be used to train one or more models managed by the machine learning component 318. Additionally, audio samples of particular abnormalities during such audio segments may be used to train one or more models managed by the machine learning component 318 to detect the presence of abnormalities in subsequently-provided audio data to be analyzed In example embodiments, engine audio samples and associated tags, for example captured digital engine audio data along with associated tags that may be stored in the audio data 326 in the memory 304, may form a database from which to train the machine learning algorithm, as well as validate machine learning results. Other machine learning algorithms may also be used, for example, deep learning, linear models, probability models, unsupervised clustering, non-linear regression models, kernel regression models, Bayesian regression, naive Bayes regression etc., for example, ordinary least squares, ridge regression, or support vector machines. Other learning models include logistic regression linear discriminant analysis, decision trees, k-nearest neighbor algorithm, similarity learning, kNN clustering, Boosted trees, convolutional neural networks, etc. Additional methods by which machine learning may be applied within the context of audio diagnostics for vehicle engines are further described below in connection with FIGS. 11-12.

In alternative embodiments, the machine learning component 318 may not be included within the audio diagnostics tool 312, and instead is included at a server, such as server 112. In such embodiments, audio data, including associated data such as tags, can be sent to the server 112 for purposes of automated analysis to identify features such as those noted above. Machine learning, as may be implemented at server 112, is further described below.

In the example shown, the visual representation generation component 320 is configured to generate a visual representation of captured audio data. In some embodiments, any of audio processing engine 316, machine learning component 318, or visual representation generation component 320 converts digital audio data into a Mel power spectrogram, which is a two-dimensional graphical representation of audio volume in decibels as a function of both audio frequency and time. Features identified within a Mel power spectrogram may be used as inputs to a machine learning model, such as machine learning models and algorithms discussed above.

In some examples, advantages of visual representations of the captured audio data include patterns that are easy to identify upon visual inspection, easy to validate, and easy to label.

Figure 4:
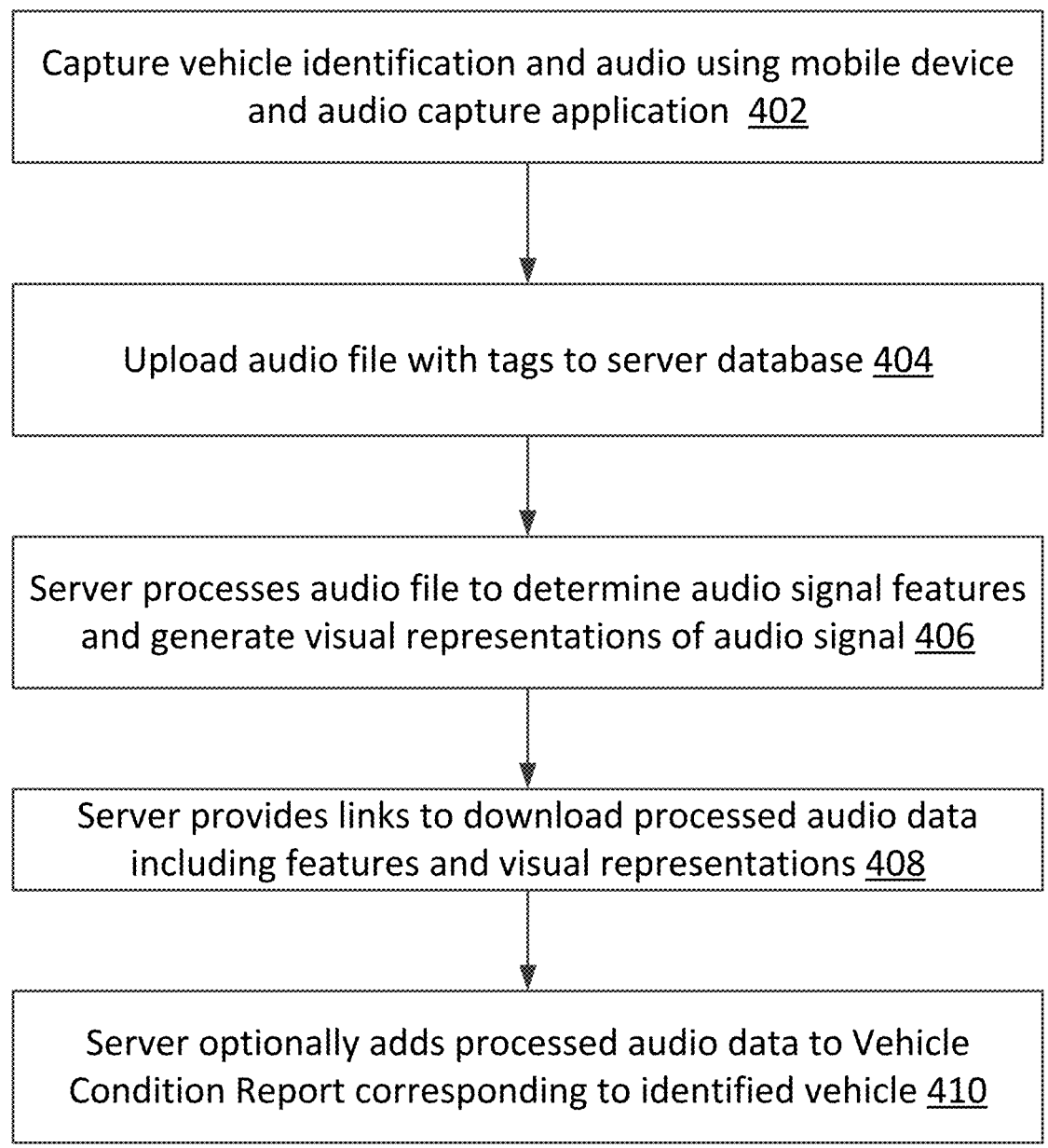
FIG. 4 is a flowchart of a method for audio capture and diagnosis, according to an example embodiment of the present disclosure.

FIG. 4 is a flowchart of a method 400 for audio capture and diagnosis, according to an example embodiment of the present disclosure. The method 400 can be performed, for example, at a computing device or a server, such as computing devices 106, 122, 124, or 126, and server 110 of FIG. 1.

In the example shown, the method 400 includes capturing vehicle identification and audio using a mobile device with an audio capture application, such as mobile device 106, at step 402. The audio is stored as a digital audio file, and tags identifying conditions during audio capture are associated with the audio file. Additional information captured regarding the vehicle (e.g., other vehicle identifying or condition information) can be associated with the audio file as well. Further details regarding methods for capturing and tagging vehicle audio are included below in connection with FIG. 5. At step 404, the captured audio, and any related information, including tags, are uploaded to a server, such as server 110 described above. At step 406, the server processes the audio file, and may generate a visual representation of the audio signal, as well as determine features in the audio file correlated with vehicle condition and identify the location of those features in the audio file or its visual representation. Also at step 406, the server may further determine the cost of repair or arbitration, determine a value adjustment to the vehicle, or assign a market value to the vehicle relative to vehicles of similar type based on the determined features that are correlated with the vehicle's condition.

At step 408, the server provides links to, or otherwise makes available, the processed audio data, which may include features correlated with vehicle condition and visual representations of the captured audio data. At step 410, the server optionally adds the processed audio data to a vehicle condition report of the vehicle from which the audio data was captured.

Figure 5:
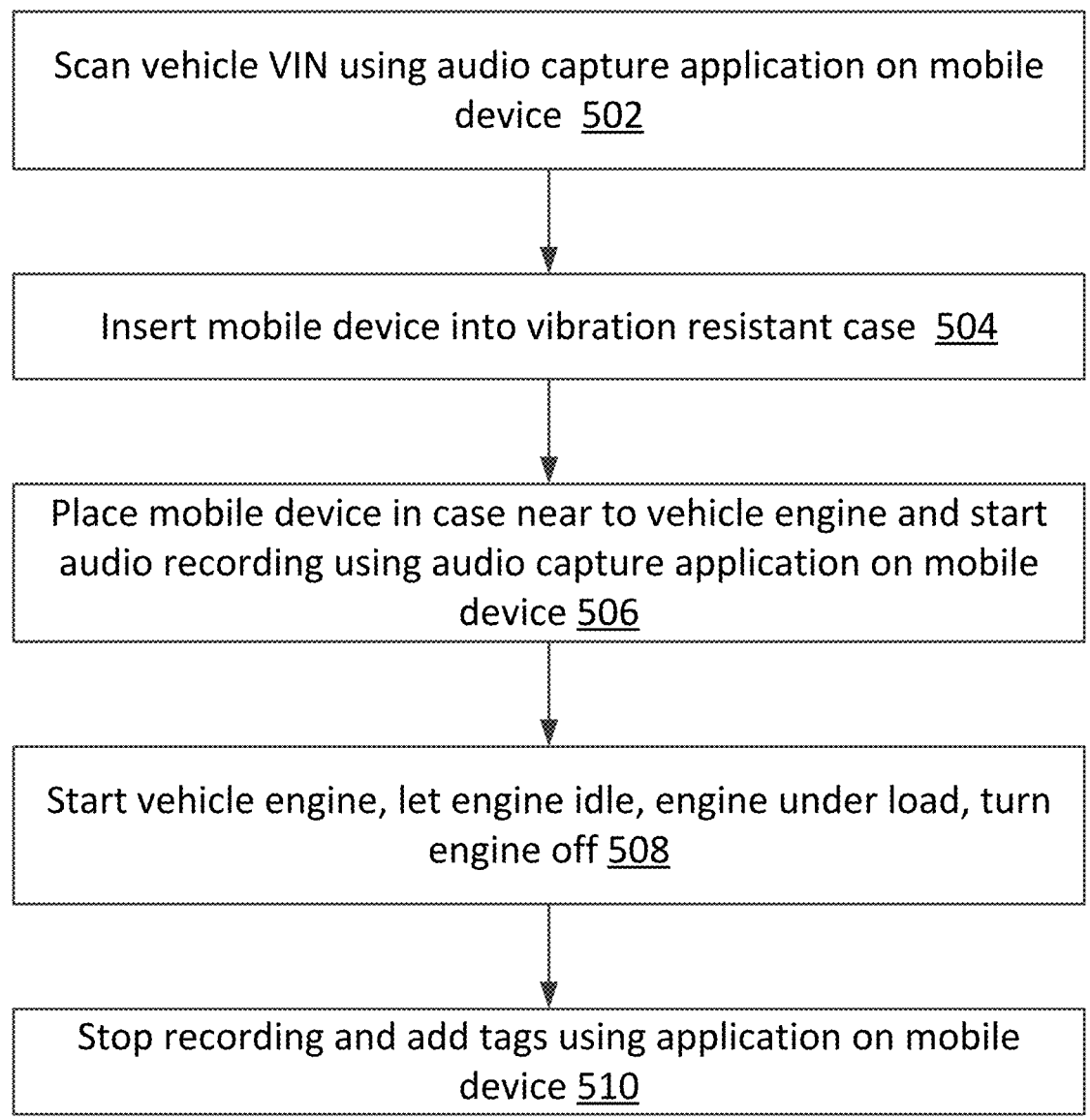
FIG. 5 is a flowchart of a method for capturing audio data, according to an example embodiment of the present disclosure.

FIG. 5 is a flowchart of a method 500 for capturing audio data, according to an example embodiment of the present disclosure. The method 500 may be performed by a user, e.g. a person having a mobile device, such as mobile device 106, and application software configured to capture audio data and associated user-input tags and/or other environmental information, and upload the data to a server, such as server 110. At step 502, the vehicle identification number (VIN) of the vehicle is scanned or otherwise input into application software on the mobile device. In addition, other objective, available data may be imported into the mobile device as well; for example, a user may manually enter data associated with the vehicle under inspection (e.g., make, model, trim level, color, etc.). At step 504, the mobile device is inserted into a vibration resistant, anti-slip mobile device case. The mobile device case is designed to house the particular mobile device used for audio capture, e.g. a smartphone, and to isolate vibratory noise interference associated with audio pick-up. In some embodiments, a microphone connectable to the mobile device, for example using a micro USB or other electrical connector, is attached to the case. In some embodiments, the microphone is a high-quality microphone including a sock to mitigate wind or other ambient noise. In still other embodiments, the mobile device case is designed to house the microphone only and the microphone is inserted into the case. The microphone may then connect wirelessly to the mobile device which may be located remotely from the microphone.

At step 506, the mobile device in the vibration resistant, anti-slip case is placed near to the vehicle engine, and audio recording is initiated using the application software on the mobile device. In some embodiments, the hood of the vehicle is raised and the microphone of the mobile device in the case is placed on the frame of the car near the engine. Optionally, at this time, an audio sample is captured to obtain a baseline of environmental noise that may be present in the vicinity of the vehicle. This audio sample can be used for, e.g., selecting and tuning a filter to cancel non-engine audio from subsequently captured recordings. This additionally ensure that an audio response corresponding to an entire engine start sequence is captured.

At step 508, the vehicle engine is started, the engine is allowed to remain on and idling for a period of time, and then a load is applied to the engine (e.g., revved to higher RPMs) for a period of time, and the engine is then turned off. At step 510, the audio capture recording is stopped, and tags are selected in the application software based on the engine audio.

In an example embodiment, the tags are selected by the user and correspond to conditions, such as the weather, when the audio was captured and subjective user judgment of the engine sound during audio capture. Such tags may include engine tick, such as when the engine makes an audible ticking sound when running, engine knock, such as when the engine makes an audible knocking sound when running due to poor, incomplete, or premature combustion, or belt squeal, such as when an engine belt makes an audible squealing sound when the vehicle is running. Tags may also include sounds from ancillary components such as a turbo's radiator compressor, pumps, chains, pulleys, or ball bearings. Tags may also include warm start, such as when the vehicle had been previously started within a certain period of time, e.g. 30 minutes, or shorter or longer than 30 minutes, before being started for audio capture. Tags may also include wet weather, such as wet or humid conditions during engine start while capturing audio, or exhaust smoke, such as abnormal exhaust color, e.g. blue-gray, white-gray, black, etc. Tags may also include difficult start, such as when engine start takes longer than usual or multiple attempts were made. Tags may also include the type of engine, such as a hybrid gas-powered and electric engine.

In addition to manually entered tags, in some embodiments, the mobile device may also capture objective condition data regarding the vehicle, e.g., from the On-Board Diagnostic (OBD-II) scanner interface. For example, a stream of engine events may be captured and uploaded to the mobile device to be associated with the audio data, such as an engine temperature, misfire codes, or other OBD-II events. Such data can be used, as discussed below, for either correlating to specific events detected in audio data, for synchronizing audio and event data, and/or for training one or more machine learning models when supplied in combination with audio data, as noted below. As further noted below, the tags and other identifying information can, when used in conjunction with the audio file (or some portion thereof), assist in detecting one or more otherwise undetected vehicle engine conditions based on analysis thereof using a machine learning model. Accordingly, additional tags may be added, as discussed further below.

FIGS. 6A-6D illustrate views of a vibration resistant anti-slip case 600, according to an example embodiment of the present disclosure. The case 600 may be made from vibration resistant and anti-slip material, such as neoprene, rubber, or other polymers or plastics.

In the embodiment shown, the case 600 is sized to receive a mobile device, such as a cellular telephone. The case 600 can be constructed from one or more housing pieces, and flexibly retains the mobile device while dampening vibration experienced by the mobile device.

Figure 8A:
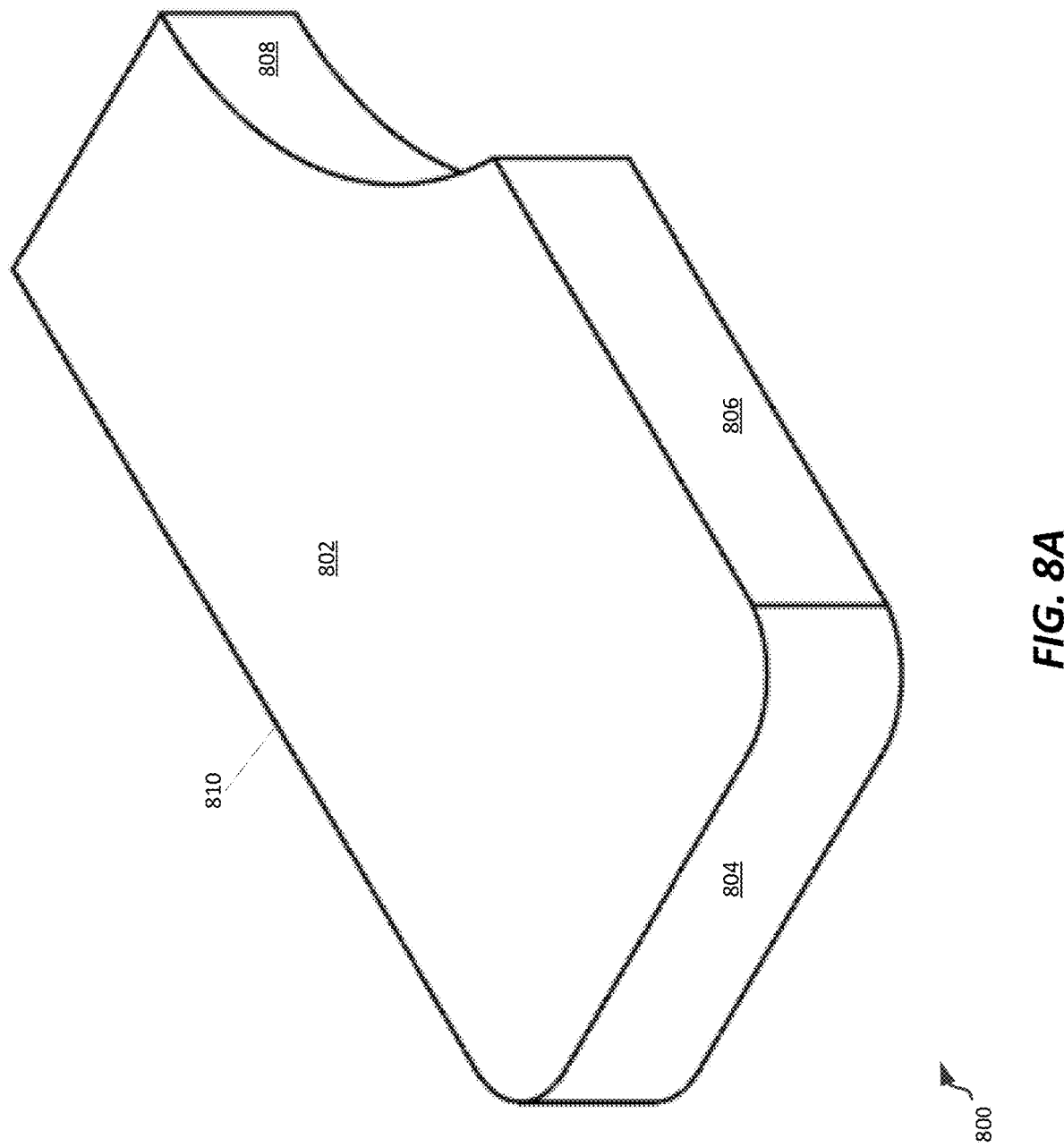
FIG. 8A is a perspective view of an example base, according to an example embodiment of the present disclosure.
Figure 8B:
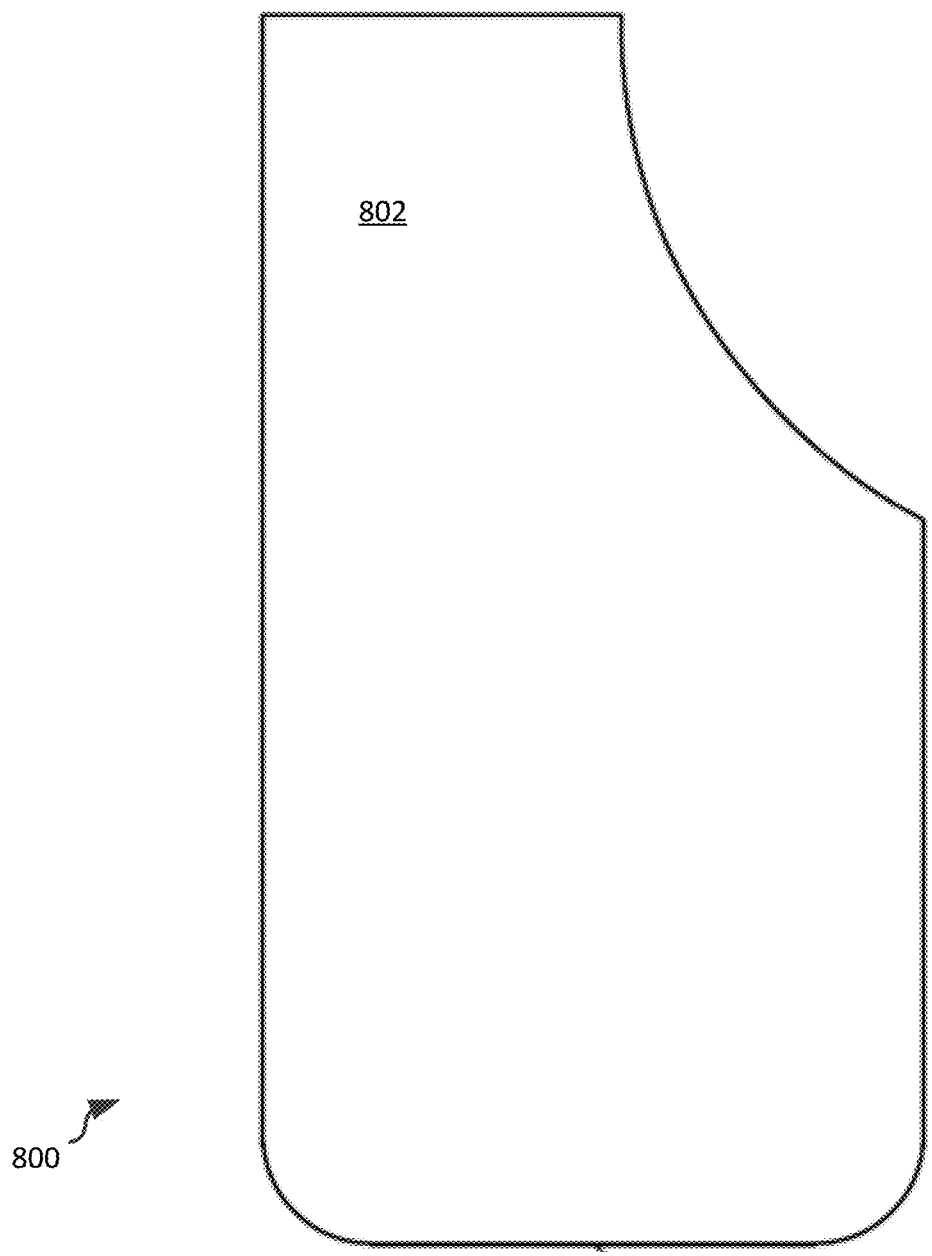
FIG. 8B is a perspective top view of an example base, according to an example embodiment of the present disclosure.
Figure 8C:
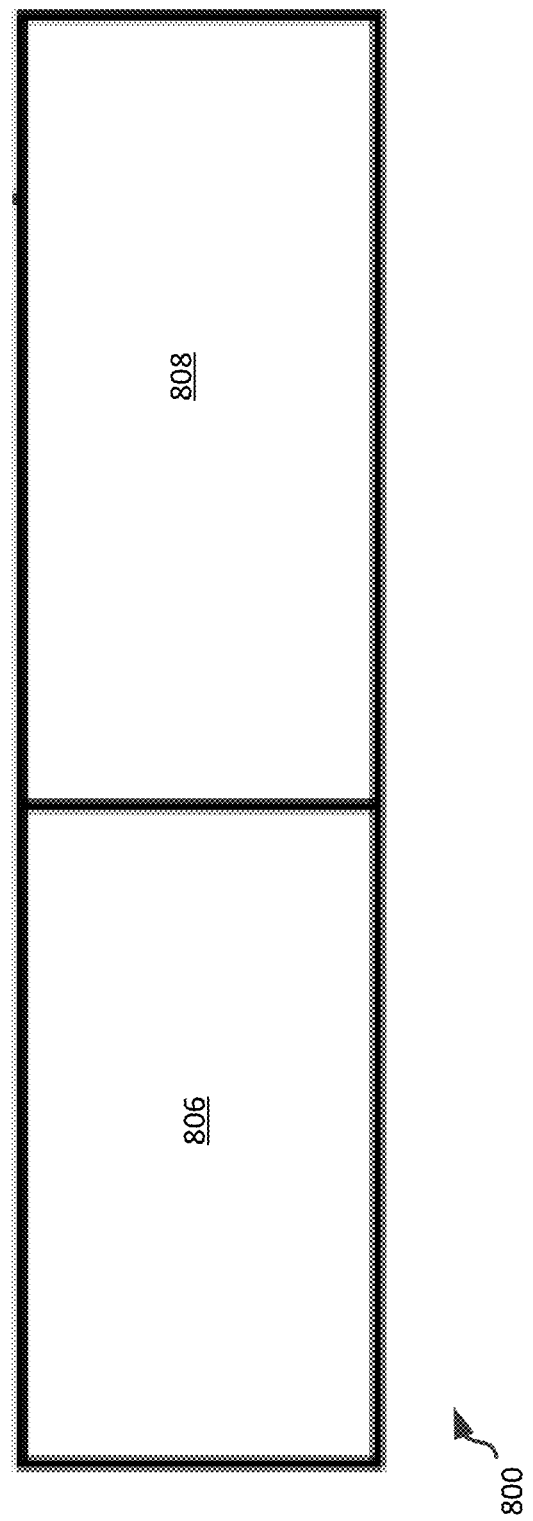
FIG. 8C is a perspective side view of an example base, according to an example embodiment of the present disclosure.

In the example shown, case 600 includes case structure 602, top-side sidewalls 604, top-side sidewall lip 606, bottom-side side wall 608, ring 610, bumpouts 612, and attachment holes 614. In some embodiments, case 600 is 3D printed as a single integrated part, although it is to be understood that other methods of forming case 600 are within the scope of this disclosure. A mobile device, such as a cellular telephone, may be inserted into case 600 with the back of the phone contacting structure 602, and top-side sidewalls 604 and top-side sidewall lip 606 flexing outward so as to receive the phone. When the phone is fully inserted, top-side sidewalls 604 contact the sides of the phone and top-side sidewall lip 606 overlaps with the front surface of the phone near the phone edge and holding the phone in the case 600. A separate clip, carabiner, or other attachment part may be attached to the ring 610 for carrying the case, for example, for clipping the case to a user's belt. Bottom-side side wall 608 may be slip-fit over the outside sidewalls of base 800 so as to attach case a vibration resistant and anti-slip base, as described further below in reference to FIGS. 8A-8C. The bumpouts 612 act as standoffs for attachment of an external microphone using a clip, such as described below in reference to FIGS. 7A-7D. In the example shown, the attachment holes 614 may be threaded so as to accept screws for attaching an external microphone clip, such as described below in reference to FIGS. 7A-7D.

Figure 6A:
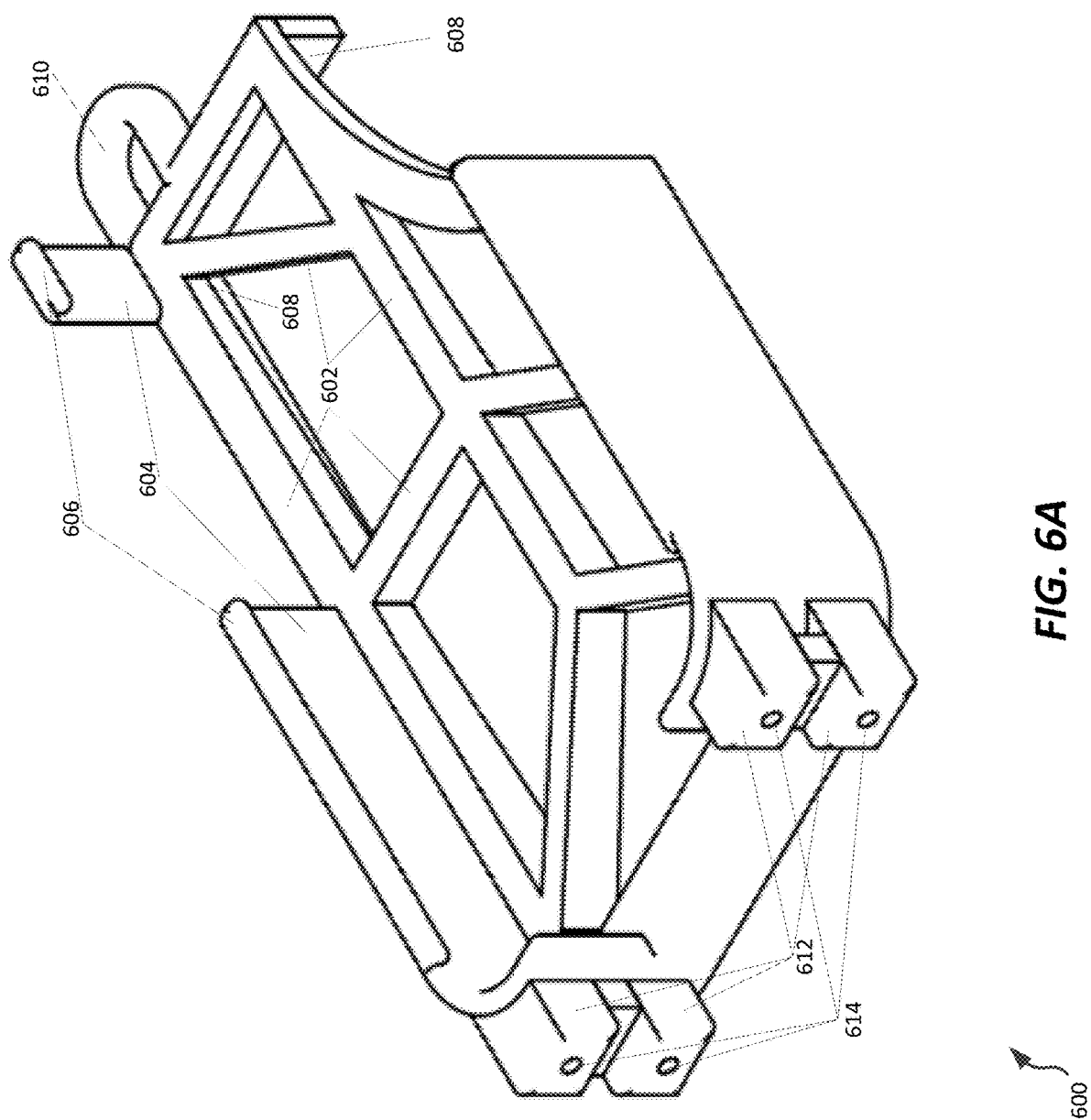
FIG. 6A is a perspective view of a vibration resistant anti-slip case, according to an example embodiment of the present disclosure.
Figure 6B:
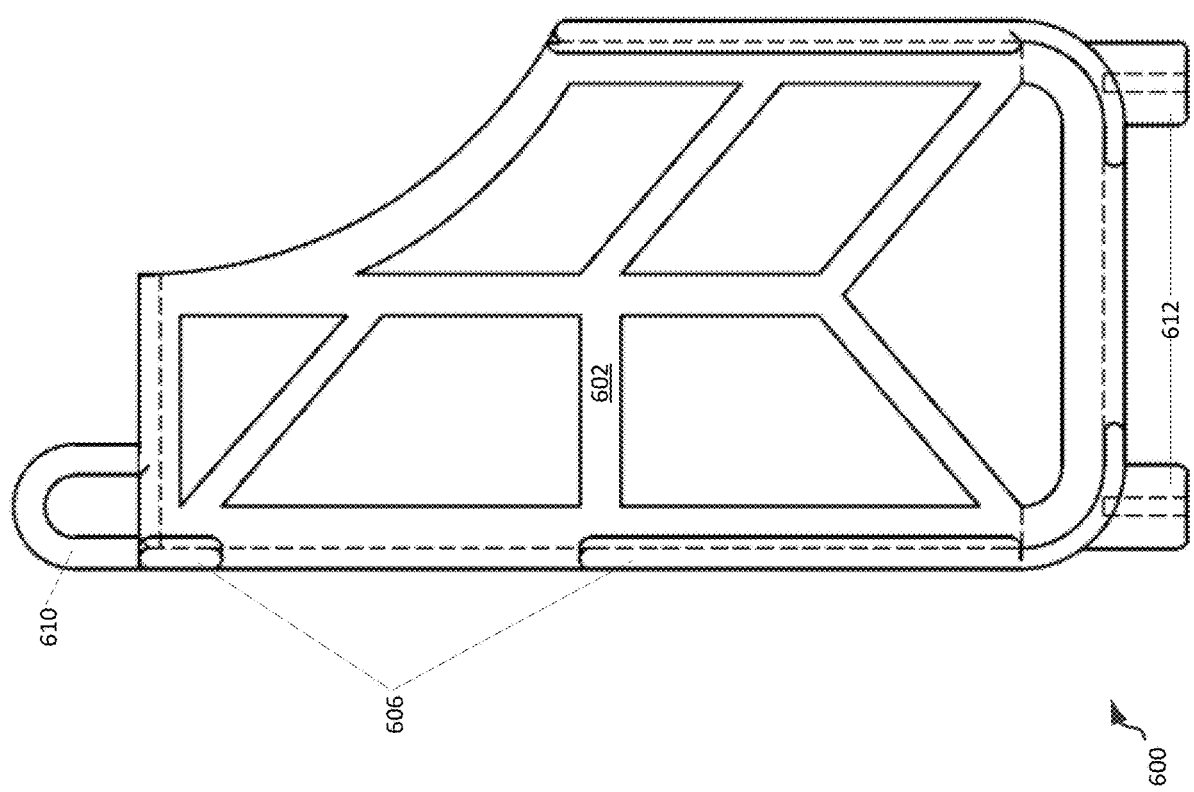
FIG. 6B is a perspective view of the top of a vibration resistant anti-slip case, according to an example embodiment of the present disclosure.
Figure 6C:
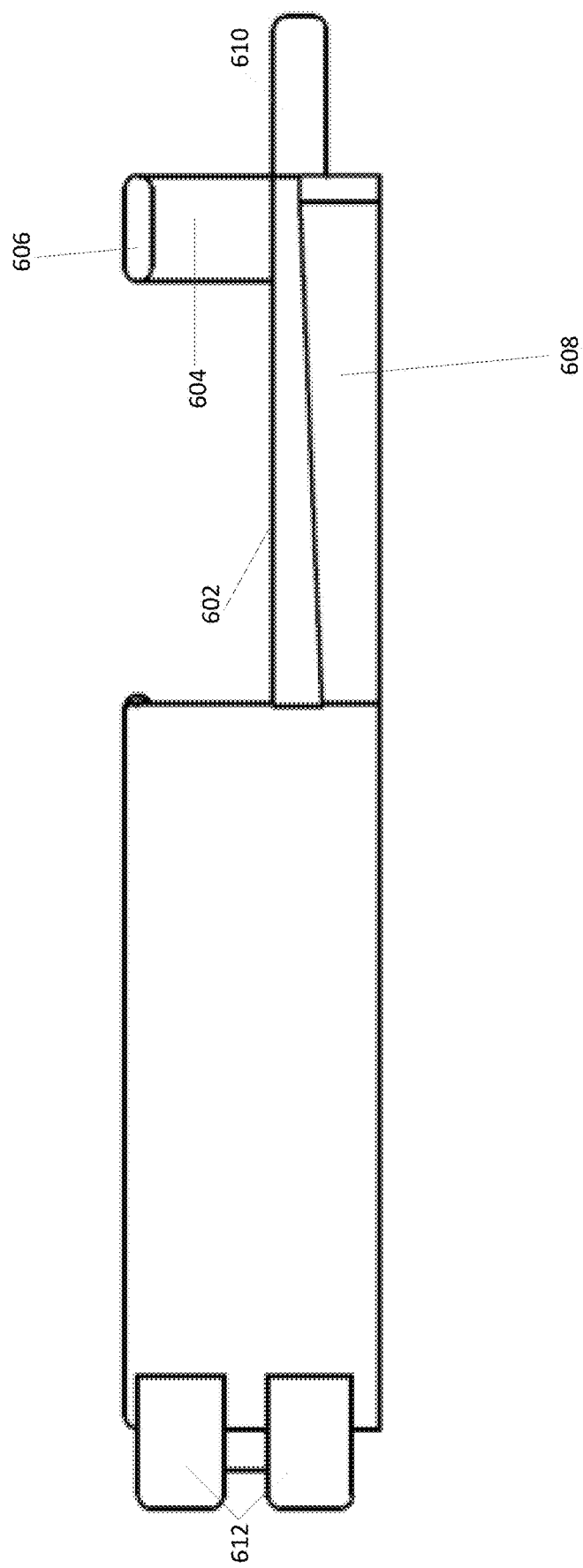
FIG. 6C is a perspective view of the side of a vibration resistant anti-slip case, according to an example embodiment of the present disclosure.
Figure 6D:
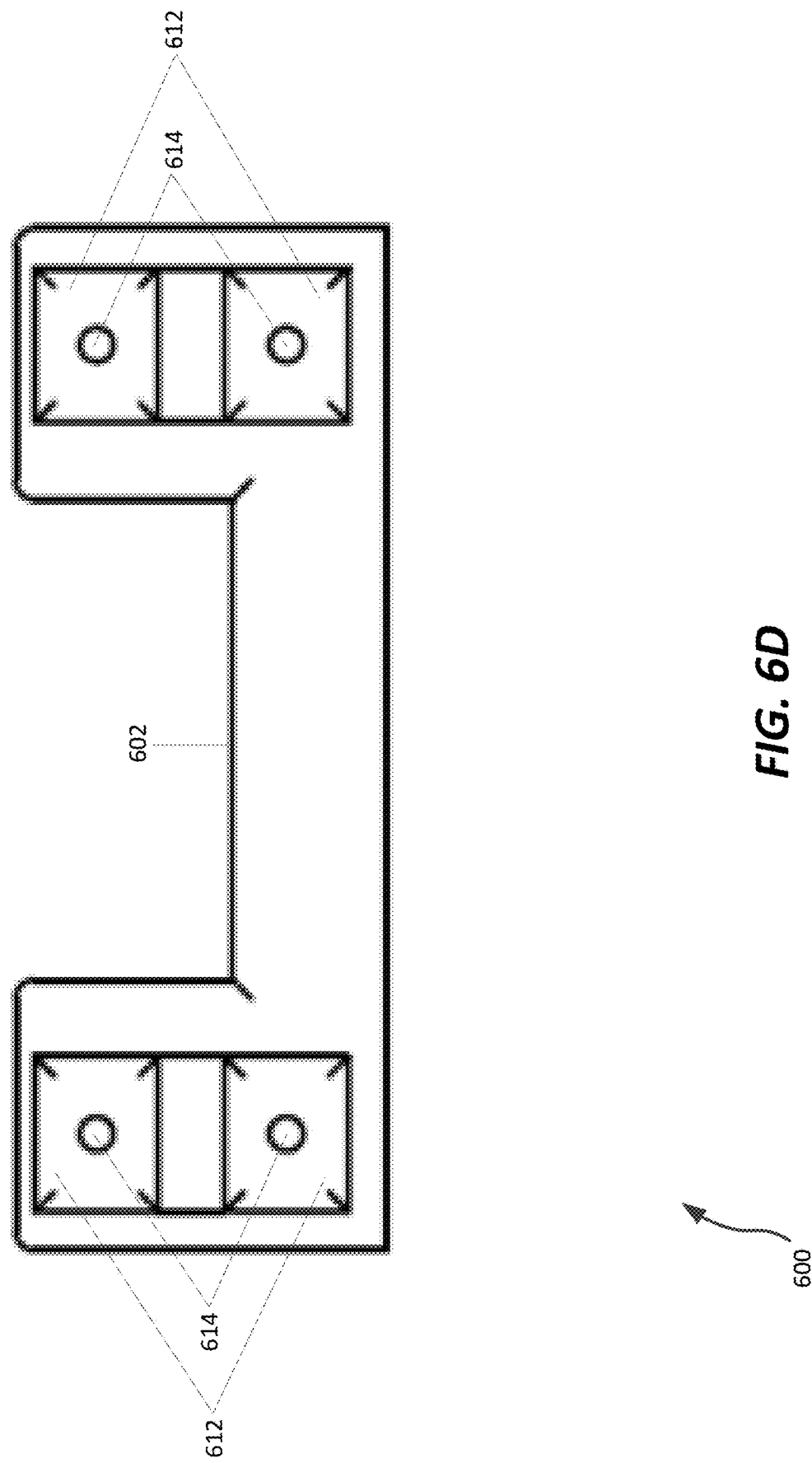
FIG. 6D is a perspective view of the bumpout-side of a vibration resistant anti-slip case, according to an example embodiment of the present disclosure.
Figure 7A:
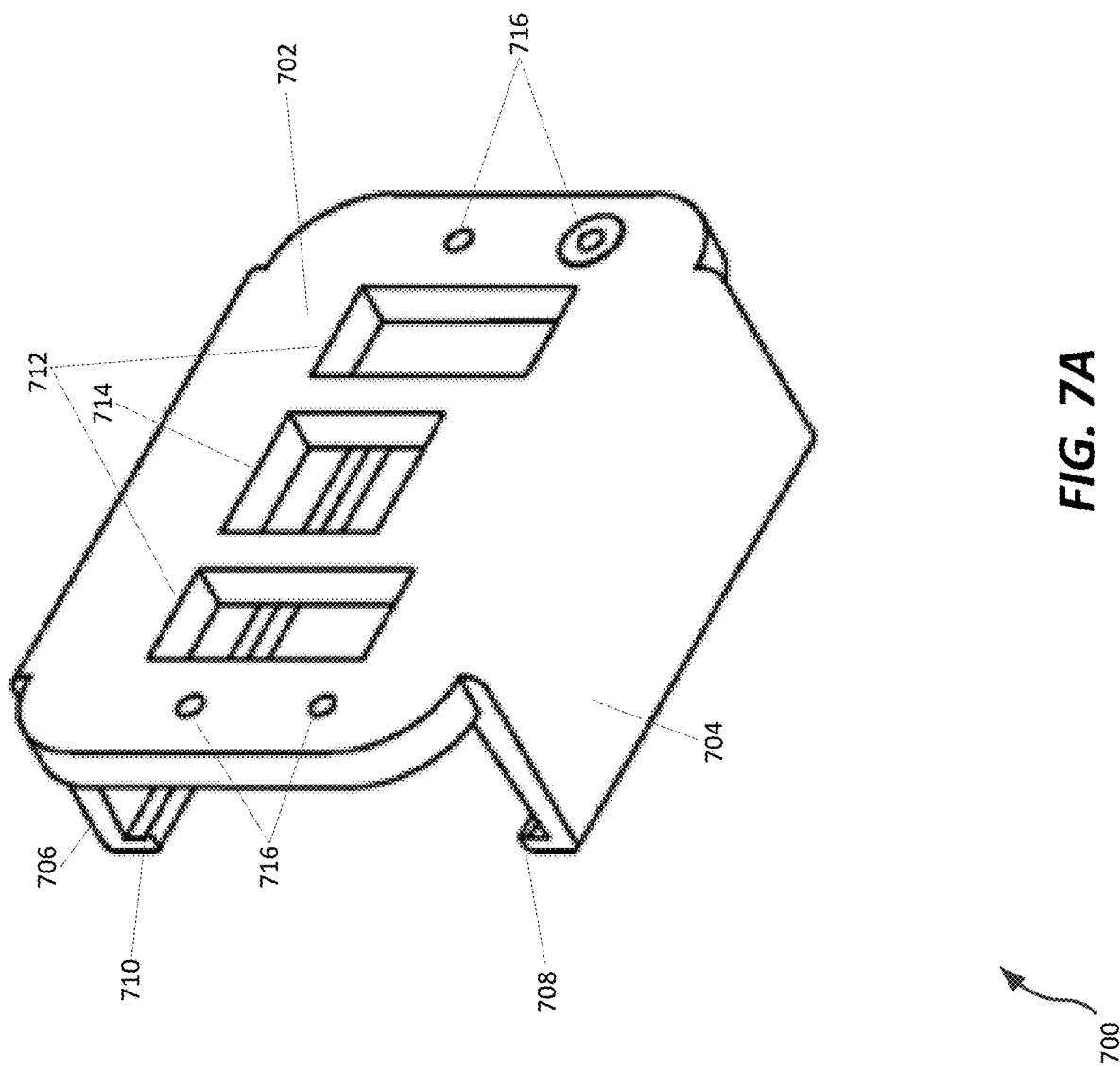
FIG. 7A is a perspective view of an example clip, according to an example embodiment of the present disclosure.
Figure 7B:
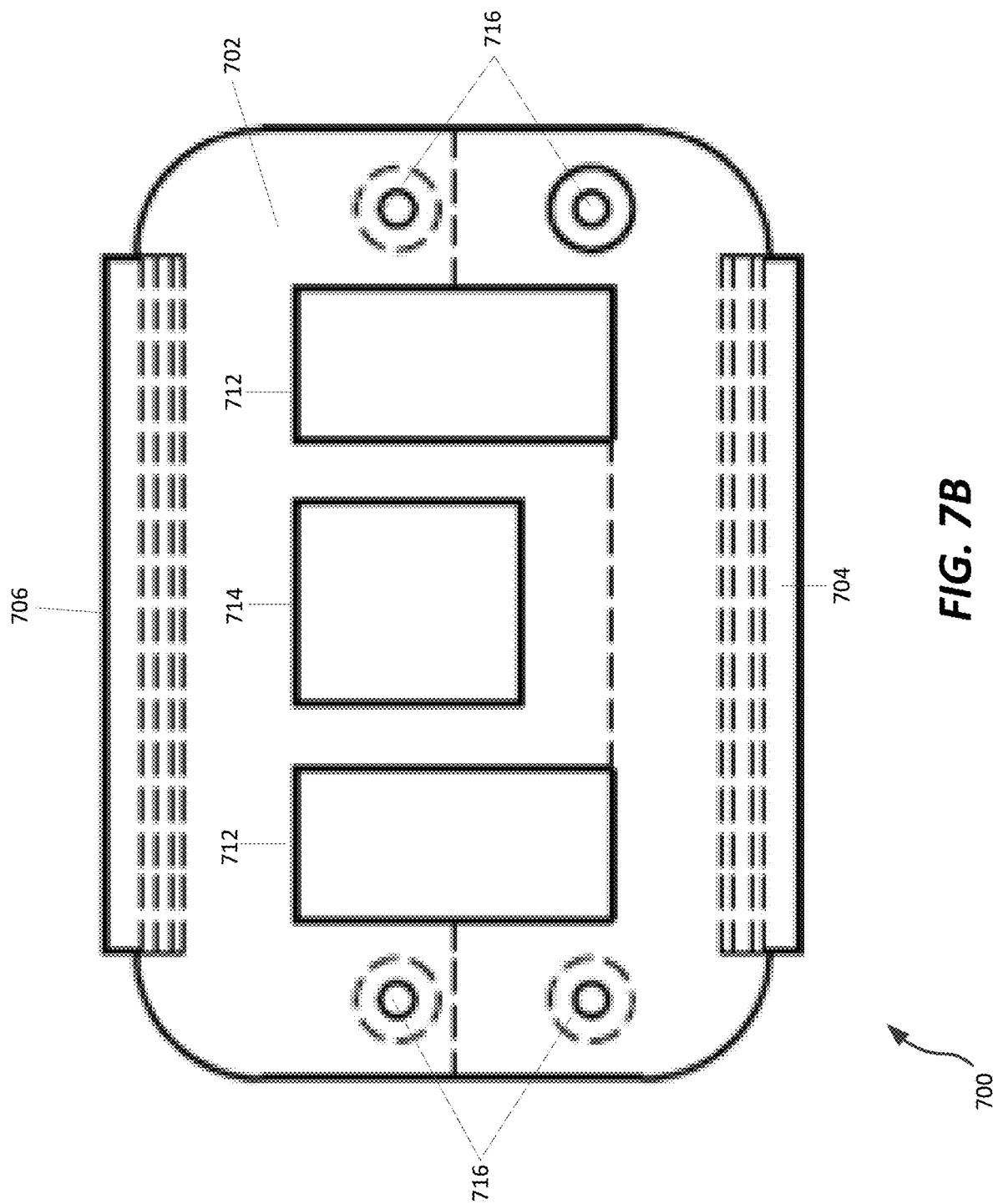
FIG. 7B is a perspective view of the back, or attachment side, of an example clip, according to an example embodiment of the present disclosure.
Figure 7C:
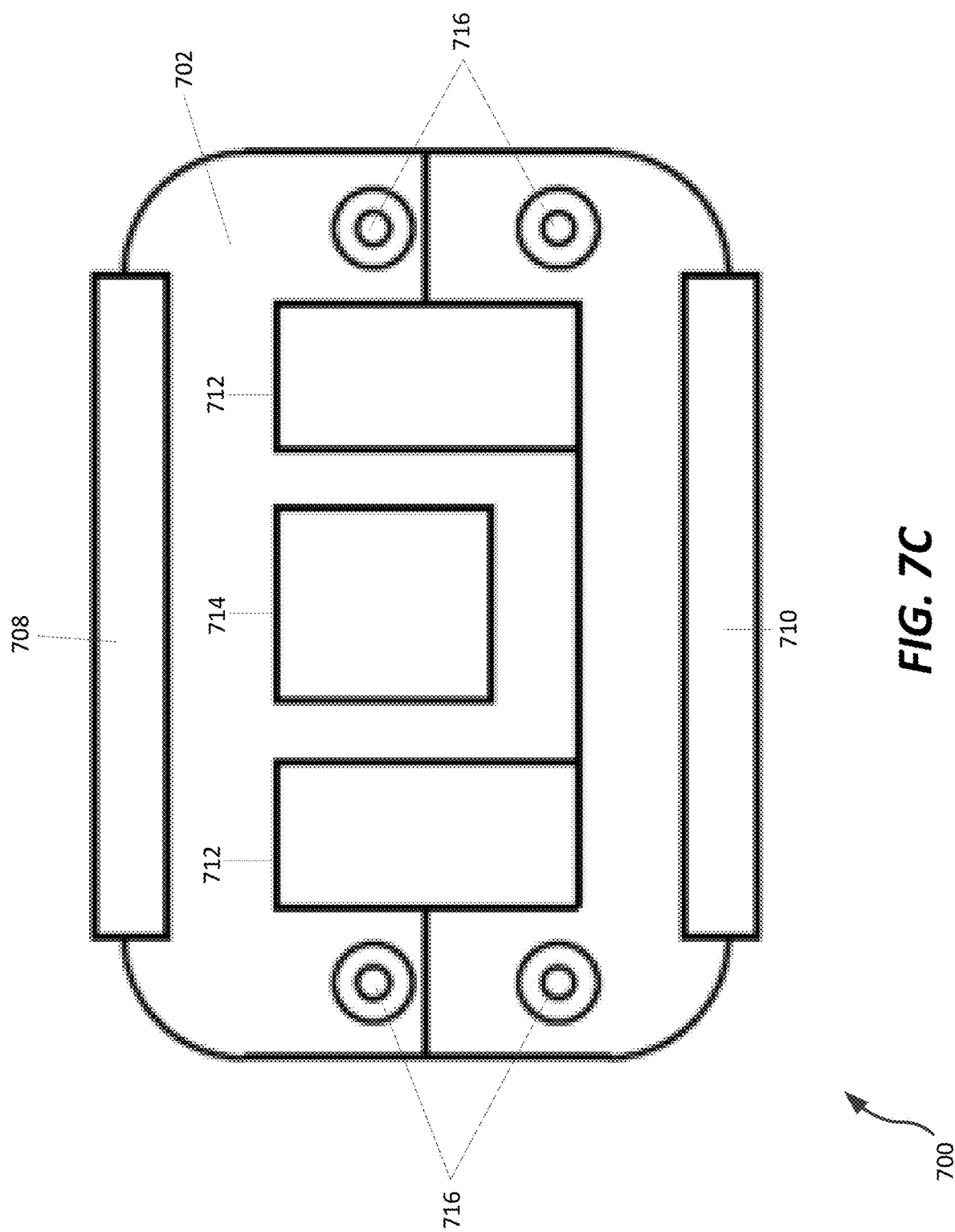
FIG. 7C is a perspective view of the front, or microphone insertion side, of an example clip, according to an example embodiment of the present disclosure.

In the example shown, and particularly as seen in FIG. 6C, the bottom-side sidewall 608 tapers in height, e.g. in the bottom-to-top direction, from a maximum near the ring 610 and decreasing in height towards the bumpouts 612. The taper in height of bottom-side sidewall 608 causes the case 600 to be tilted when it is attached to a base, such as base 800 described below, so that the end of case 600 with the bumpouts 612 is higher than the ring 610 end, relative to the bottom of the base having a constant height. In the example shown, the taper allows for extra clearance for an external microphone that may be attached to the bumpout end of the case 600 above the surface on which the base, to which the case 600 is attached, is placed. A bumpout-side of the vibration resistant anti-slip case 600 is seen in further detail in FIG. 6D.

FIGS. 7A-7D illustrate an example clip useable to attach a microphone to a mobile device that is retained within the case 600, described above. In some embodiments, the clip 700 may attach to both the case 600 and a microphone, and may be used to detachably affix the microphone to the case 600. In the example shown, the clip 700 includes a clip structure 702, bottom wall 704 and top wall 706, bottom lip 708 and top lip 710, cutouts 712, data port cutout 714, and through holes 716. The clip 700 may be made from vibration resistant and anti-slip material, such as neoprene, rubber, or other polymers or plastics.

In the embodiment shown, the clip 700 is sized to receive an audio capture sensor, such as a microphone. The clip 700 can be constructed from one or more housing pieces, and flexibly retains a microphone while dampening vibration experienced by the microphone.

In some embodiments, clip 700 is 3D printed as a single integrated part, although it is to be understood that other methods of forming clip 700 are within the scope of this disclosure. An audio capture sensor, such as a microphone, may be inserted into clip 700 with the back of the microphone contacting the clip structure 702, and the bottom wall 704 and top wall 706 flexing outward so as to receive the microphone. When the microphone is fully inserted, the bottom wall 704 and top wall 706 contact the sides of the microphone, and bottom lip 708 and top lip 710 both overlap with the front surface of the microphone near the microphone edge and hold the microphone in the clip 700. The through holes 716 may include counter-sinks so as to accept the head of a screw used to attach the clip 700 to the case 600 using the threaded holes 614, such that the head of the screws do not interfere with fully inserting a microphone so that the back of the microphone contacts the clip structure 702.

In some embodiments, the microphone may include a data connector, for example a mini-USB connector, which may be inserted into a mobile device, such as a cellular telephone. The data port cutout 714 allows a microphone connector to be attached to a mobile device, e.g., to allow for connection of the mobile device to an external microphone device for improved audio capture.

FIGS. 8A-8D illustrate an example base 800, according to an example embodiment of the present disclosure. The base 800 includes a top surface 802, a bottom surface (not shown), and sides 804, 806, 808, and 810. The base 800 may be made from vibration resistant and anti-slip material, such as neoprene, rubber, or other polymers or plastics.

In some embodiments, the case 600 of FIGS. 6A-6D may be press-fit and glued to the base 800, in which the bottom side sidewall 608 of the case 600 is shaped to match and be in contact with, and glued to, the sides 804, 806, 808, and 810. The base 800 may be placed on the frame of a vehicle, the vehicle radiator, or other relatively stationary vehicle component near the engine, and preferably under the hood of the vehicle.

In accordance with use of a case such as seen in FIGS. 6-8, an entire mobile device will be placed on a vehicle engine for recording audio. However, in alternative embodiments, a mobile device may be communicatively connected to a microphone which is separate from the mobile device. For example, a microphone may be connected by Bluetooth to the mobile device allowing the mobile device to be viewed and operated by a user while that user is operating an ignition of a vehicle, and the microphone is positioned on or near the engine.

Figure 9:
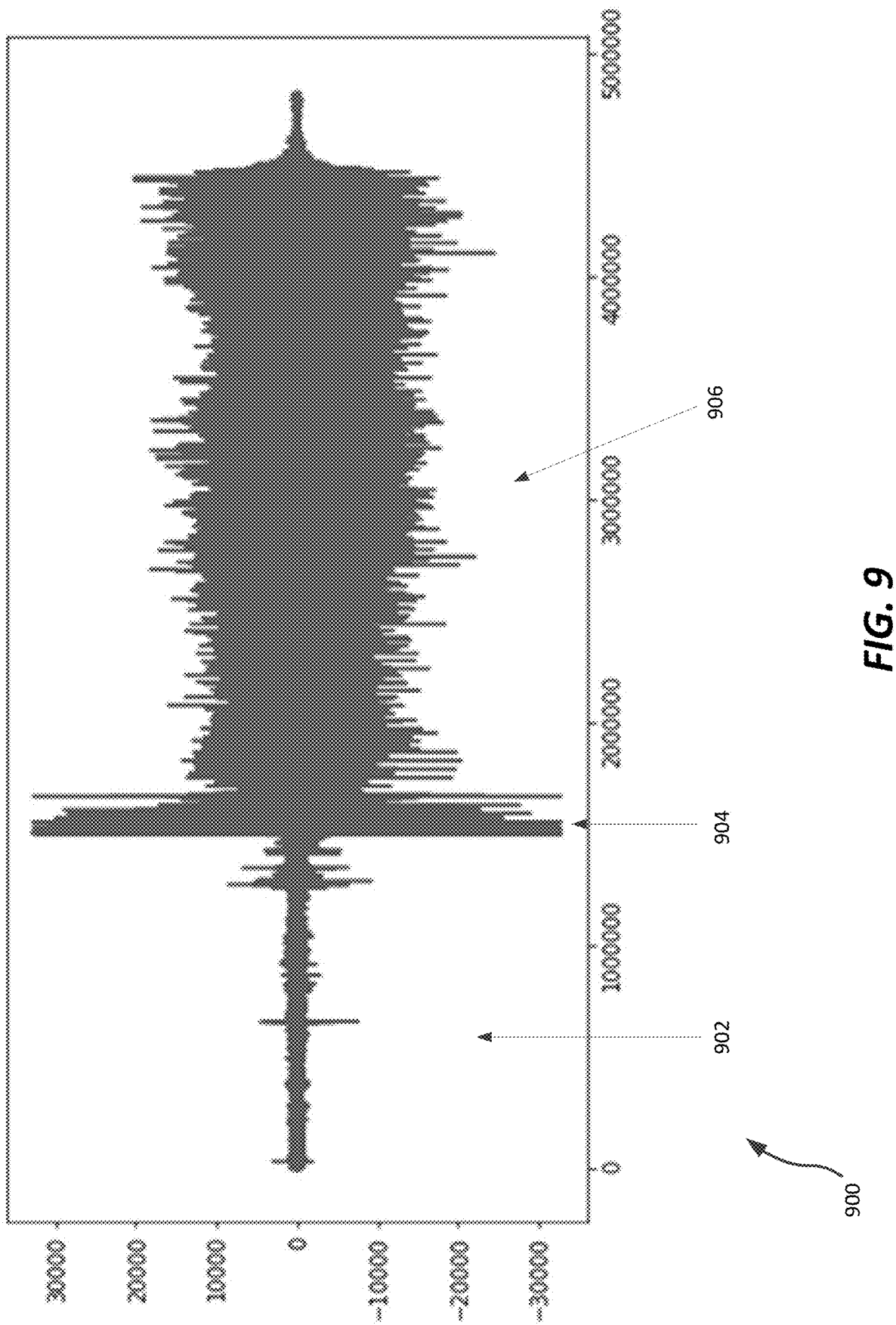
FIG. 9 is an example plot of a captured audio signal, according to an example embodiment of the present disclosure.

FIG. 9 is an example plot 900 of a captured audio signal, according to an example embodiment of the present disclosure. The plot 900 shows amplitude of captured audio in arbitrary units (e.g., normalized) along the vertical axis, and the number of digital sound samples along the horizontal axis. For a given sampling rate of audio capture, the horizontal axis may also represent time. In the example shown, time period 902 corresponds to ambient sound before a vehicle is turned on. Time period 904 corresponds to audio captured during engine start, and time period 906 corresponds to audio captured while the engine is idling or while load is applied to the engine (e.g., the engine is being revved).

Figure 10A:
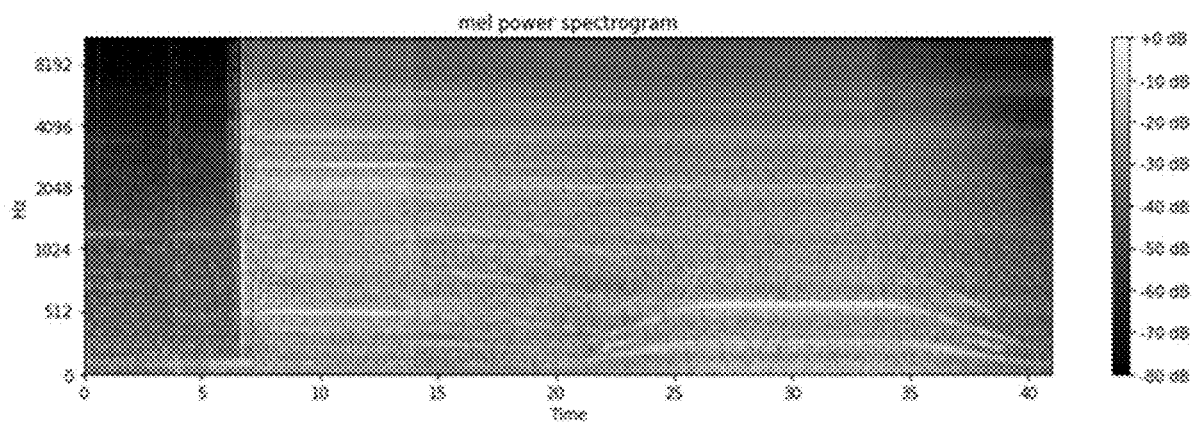
FIGS. 10a and 10b are example 2D plots of a captured audio signal, according to an example embodiment of the present disclosure.
Figure 10B:
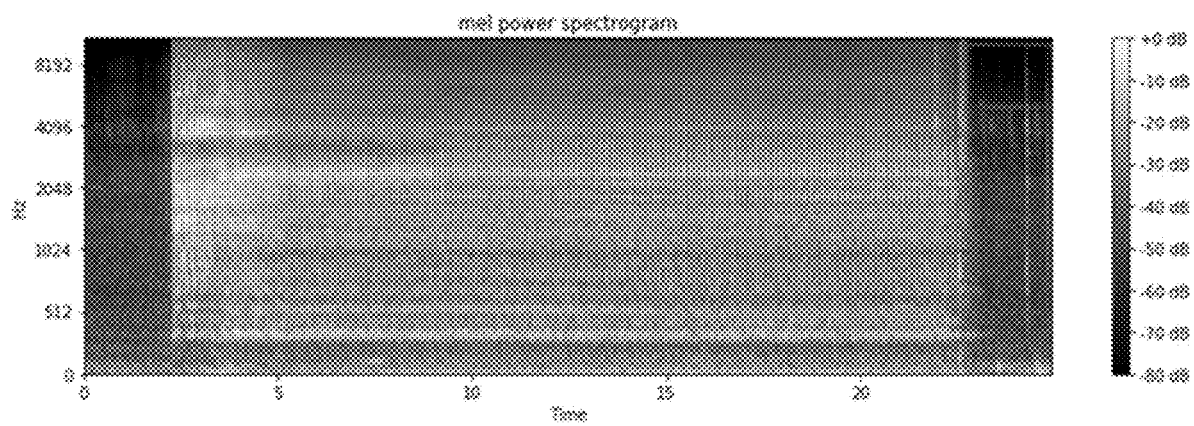

FIGS. 10a and 10b are example plots 950 of a captured audio signal, according to an example embodiment of the present disclosure. The example in FIG. 10a shows a Mel power spectrogram of a vehicle without known engine conditions. The example shows the sound amplitude in decibels as a heat map as a function of frequency along the vertical axis and time along the horizontal axis. FIG. 10b shows a Mel power spectrogram of a vehicle having a known engine knock. FIG. 10b shows features 1012 correlated with the engine knock, e.g. the repeat pattern visible in the plot. FIGS. 10a and 10b are examples of visual representations of captured audio from which features correlated with vehicle condition may be seen and identified either by a viewer or automatically, such as by server 110. However, any other visual representation of the captured audio is within the scope of this disclosure as well, for example, any 2D or 3D plot of the audio signal before or after processing.

In the context of the present disclosure, it is recognized that the captured audio signal can be included in a vehicle condition report in a number of ways. For example, a link or button that, when selected, causes playback of audio can be included in the vehicle condition report. Alternatively, a graphical depiction of the audio can be presented alongside such a selectable playback option, with the graphical depiction being represented using any of plots of FIGS. 9-10. In any such embodiments, specific tags associated with the audio recording can be displayed in association with the audio recording. For example, such tags can be displayed with the recording generally, or associated with a particular time or location within the recorded audio. Vehicle condition reports are further described below in connection with FIGS. 15-16.

Figure 11:
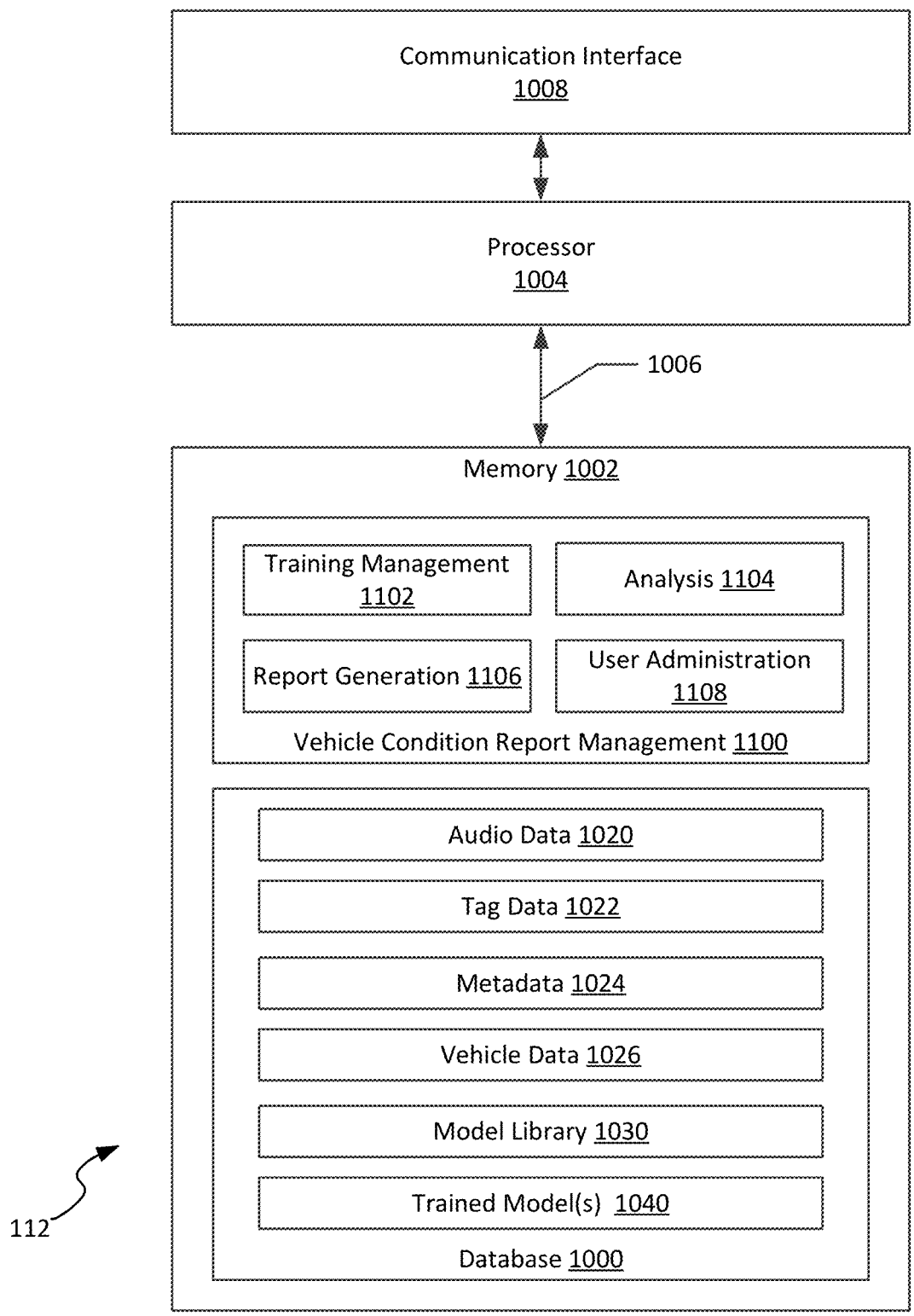
FIG. 11 is a schematic illustration of a server useable to analyze vehicle audio data, according to an example embodiment of the present disclosure.
Figure 12:
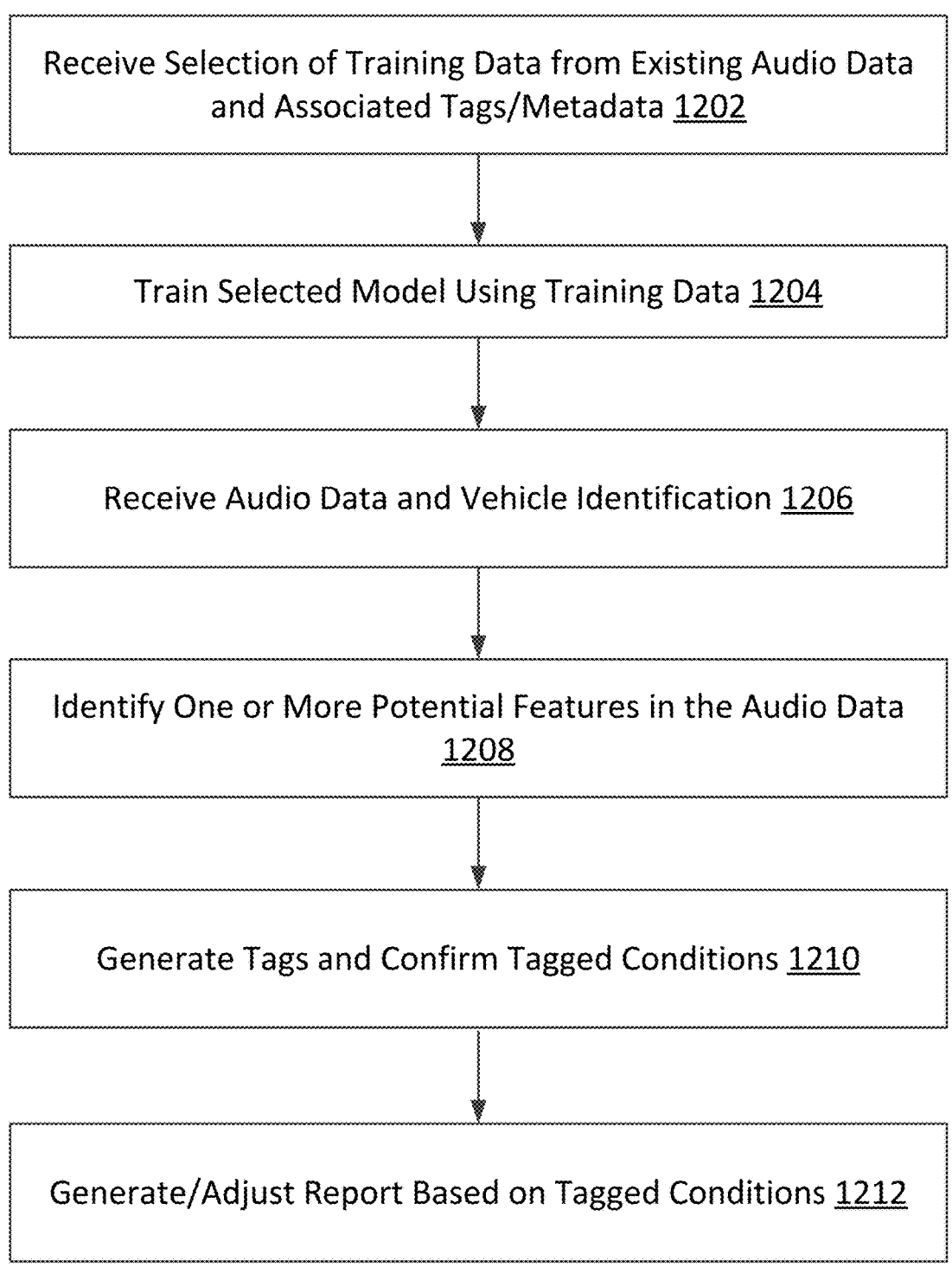
FIG. 12 is a flowchart of a method of analyzing vehicle audio data, according to an example embodiment.

Referring now to FIGS. 11-12, example applications of the vehicle audio capture system described herein are provided. In example aspects, captured vehicle audio data can be tagged with the identifying information associated with the vehicle make and model or type of engine, as well as features identified in the audio data. The features identified may be, for example, based on engine tick, engine knock, belt squeal, ancillary components such as a turbo radiator compressor, pumps, chains, pulleys, or ball bearings. The captured vehicle audio data can be tagged with other information associated with audio capture, such as conditions of an engine start recording, e.g., warm start, wet weather, exhaust smoke, or difficult start conditions.

In FIG. 11, additional details regarding server 112 are shown. In the example shown, server 112 hosts a database 1000, which stores vehicle audio data from mobile devices in the manner described above. The server 112 can, as noted above, generate reports and perform analysis that integrates information from those vehicle audio data. In example embodiments, the database 1000 has an edge table structure in which tags are associated with captured audio files, for purposes of generating vehicle condition reports. Such tags indicating vehicle conditions or vehicle attributes can be manually added or automatically detected, as described further below.

In the example shown, the database 1000 is stored in a memory 1002 alongside a vehicle condition report management tool 1100. A processor 1004 is communicatively connected via a bus 1006 to the memory, and executes instructions stored in the memory, including instructions defining the vehicle condition report management tool 1100. A communication interface 1008 allows the server 112 to communicate with other devices, e.g., to receive the vehicle audio data and provide vehicle condition reports to other devices.

In the embodiment shown, the database 1000 stores audio data 1020, tag data 1022, and metadata 1024, alongside other vehicle data 1026. The audio data 1020 generally includes the vehicle audio data uploaded to the database 1000 from one or more mobile devices or other computing systems at which the audio data is captured and created. The audio data 1020 therefore generally corresponds to the vehicle audio data from each of a plurality of different vehicle makes and models. The audio data 1020 may be stored in the form it was captured, e.g. as an audio data file in a particular format. The audio data 1020 may also be stored in other forms, e.g. after processing or transformation of the captured audio data into form or representation of the captured audio such as a Mel power spectrogram.

The tag data 1022 includes one or more tags associated with at least some of the audio data. The tags included in the tag data 1022 may be associated with the audio data overall, or may be associated with a particular location or region within the associated vehicle audio data. For example, a tag associated with audio data, or an audio data file, may indicate the presence of engine knock generally, or may be associated with a location in the audio data signal where such engine knock is apparent, or may be associated with a location in the audio data, the audio data being represented in a different form, e.g. a Mel power spectrogram. In the example embodiments, and as discussed above, tags included in the tag data 1022 may be associated with vehicle audio data by a user prior to upload of the audio data and tag. Additionally, in some embodiments tags may be automatically associated with particular audio data or audio data files. In such embodiments, audio data analysis may be performed to identify features in the vehicle audio data. Such audio data analysis may be based on, for example, providing audio data to a trained model of vehicle audio data which can then suggest one or more tags that may be appropriate to be associated with a particular vehicle audio data.

The metadata 1024 represents other information that may be associated with specific vehicle audio data. For example, the metadata 1024 may include, for example, a time and date of audio data capture, and other information inherent in the audio data, for example, the device used to capture the audio data, location (latitude/longitude), etc. Additionally, metadata 1024 may include additional information that a user capturing the audio data may wish to associate with the audio data, for example, a vehicle identification number (VIN) that uniquely identifies the vehicle, or other information known about the vehicle, such as regarding features (e.g., engine knock, engine tick, difficult start, etc.) or known problems with the vehicle, such as issues regarding the operating condition of the vehicle.

The vehicle data 1026 can include other information associated with the vehicle that may be obtained and linked to the audio data 1020, tag data 1022, and metadata 1024. The vehicle data can include, for example, other condition information entered into a vehicle inspection application, such as the audio capture application described above with respect to FIG. 4. For example, the vehicle condition report can include ownership records, images of the interior and exterior of the vehicle, maintenance records, or information captured from the vehicle, such as OBD-II data, or other vehicle information. Such information can be the basis of a suggested value for the vehicle, or can be used by prospective purchasers to make informed bids regarding the vehicle. Vehicle condition reports are further described below in connection with FIGS. 15-16.

In accordance with some embodiments, and to support machine-learning based audio data analysis of the vehicle audio data, the database 1000 stores, in the example shown, a model library 1030 and one or more trained models 1040. Generally, the model library 1030 stores one or more possible machine learning models that may be selected for use in analyzing the vehicle audio data for purposes of automatically identifying features in the audio data. Example models that may be selected include, for example deep learning models and regression models, although other models may be utilized as well.

The trained models 1040 can include one or more models that are useable to identify features in vehicle audio data. For example, a model selected from the model library may be trained with a set of training data drawn from the audio data 1020, tag data 1022, and metadata 1024 to identify features in vehicle audio data. In example embodiments, the training data may be selected to provide a trained model for each vehicle make and model, and can be trained on captured audio from a new model of the vehicle, as well as from vehicles having known conditions and tags in the tag data. In some embodiments, the training data can include audio data and/or tags from other makes and models of vehicles, to provide comparative data between vehicles with and without a particular condition. This may enable a trained model to recognize conditions for which insufficient data exists for the specific vehicle make/model being assessed. In some instances, the vehicle makes/models used in a training data set may include those having similar characteristics (e.g., same number of cylinders or overall cylinder displacement, same engine manufacturer or same engine, etc.).

In some examples, a selected model is trained on vehicle audio data for a particular make and model of vehicle, including audio data of new vehicles and audio data of vehicles having features (e.g., degradation or enhanced features) that are tagged (i.e., audio data having tag data associated therewith in the database 1000). In other examples, two or more models are trained on vehicle audio data for such a make/model, and either a composite model may be formed, or a best candidate may be selected from the trained models 1040.

In still further examples, one or more selected models may be trained on a subset of data across a plurality of makes/models of vehicles, such as a particular class of vehicles (e.g., passenger cars), a particular manufacturer, or on some other basis. Training a model on a wider variety of types of vehicles may allow the model to automatically detect a vehicle make/model from the vehicle audio data (from among the trained vehicle makes/models) as well as to identify features in that audio data.

In accordance with the present disclosure, each of the various types of data 1020-1026 can be used in various combinations for training a model which can in turn be used to automatically identify features in vehicle audio data. This may include automatically suggesting potential tags associated with features detected in the vehicle audio data, for optional confirmation by a user. Such automatically identified features may be the basis for adjusting an estimated value for a vehicle, or determining an expected sale price of the vehicle based on sales prices of vehicles having similar make/model information and similar combinations of tags applied thereto.

Still referring to FIG. 11, the vehicle condition report management tool 1100 includes a training manager 1102, an analysis module 1104, a report generator 1106, and a user administration tool 1108.

The training manager 1102 manages selection of training data and selection of a model to be trained from the database 1000 for purposes of generating trained models 1040. In example embodiments, the training manager 1102 can periodically assess and retrain models included among the trained models 1040, or replace trained models with improved trained models, according to predetermined criteria (e.g., age or accuracy of the model, or amount/type of training data used).

The analysis module 1104 accesses one or more trained models and one or more vehicle audio data to be analyzed, and provides the audio data to the trained models for purposes of generating one or more suggested feature tags for that audio data, as noted above. The analysis module 1104 can perform, for example analysis of vehicle audio data features and adjust additional descriptive data associated with the vehicle, for example by detecting a type of the vehicle, make/model, features, etc. Additionally, an estimated value for the vehicle can be adjusted by the analysis module 1104 as well in response to detected features or a detected identification of the vehicle based on the vehicle audio data.

The report generator 1106 generates vehicle condition reports that can be accessed by users. The vehicle condition reports are generally specific to a particular vehicle, and can include detailed information about the vehicle including, but not limited to, the types of information described above as being stored in database 1000. Such reports may be made available to users of the vehicle inspection application having a predetermined set of access rights defined using a user administration tool 1108.

The user administration tool 1108 generally allows users access to upload or access data in the database 1000. For example, the user administration tool 1108 controls access rights for vehicle inspectors to be able to upload information to the database or modify information in the database as to vehicles that inspector may be associated with (e.g., that he/she inspected), or for prospective bidders to access vehicle condition reports. Various other user roles may be defined and enforced via user account-based authentication as well.

Referring to FIG. 11 generally, it is noted that although certain functionality is described herein, other types of functions could be performed at server 112 as well. For example, some or all of the audio data processing techniques described above may be performed at a server, as an alternative to performing such operations at an inspection device (e.g., a mobile device useable in connection with a vehicle audio data capture system described herein).

Referring to FIG. 12, a generalized method 1200 of analyzing vehicle audio data is described, according to an example embodiment. The method 1200 analyzes a subset of available vehicle audio data and associated data (e.g., the data described above in connection with database 1000) to allow features to be detected in subsequently-analyzed vehicle audio data.

In the example shown, the method 1200 includes receiving a selection of training data from the data in the database (step 1202). The selection of training data can include selecting all or some portion of the available data from existing, tagged vehicle audio data. A machine learning model may then be selected from the model library 1030 and trained using the selected training data (step 1204), providing a trained model.

Upon completion of model training, the server may receive vehicle audio data, and optionally vehicle identification information and/or other objective data from a vehicle (e.g., OBD-II data) (step 1206). Based on the received information, one or more potential features are identified using a selected trained model (step 1208). As noted above, a variety of features can be identified in association with the audio data generally or a specific region within the audio data. In some examples, the trained model can also be used to validate the make/model of vehicle as being correctly associated with the vehicle identification that is received, as well as optionally validating different trim levels that may utilize different engine configurations.

In the embodiment shown, the identified features can be used to automatically generate tags that are to be associated with the audio data (step 1210). Optionally, those tags that are automatically generated may be presented to the user who uploaded the vehicle audio data (e.g., by transmitting the tags and optionally a copy of the audio data back to a mobile device of that user) for confirmation that the proposed tags are correct or appropriate. In other examples, the automatically generated tags are associated directly with the audio data with no confirmation required. In addition, other information regarding a vehicle may be stored in the database 1000 based on detection of attributes of the vehicle from the audio data.

Once tags are applied and optionally confirmed, the method 1200 may proceed to generate a vehicle condition report that includes the tagged vehicle audio data (step 1212). This may also include adjusting other data that might be included in the vehicle condition report, for example by adjusting an estimated value of the vehicle up or down based on the types of features identified in and tagged in the vehicle audio data, based on a regional pricing adjustment for the region from which the image is received (e.g., based on metadata 1024 associated with the audio data), and comparison to prices of other vehicles having similarly tagged features and other descriptive metadata.

Figure 13:
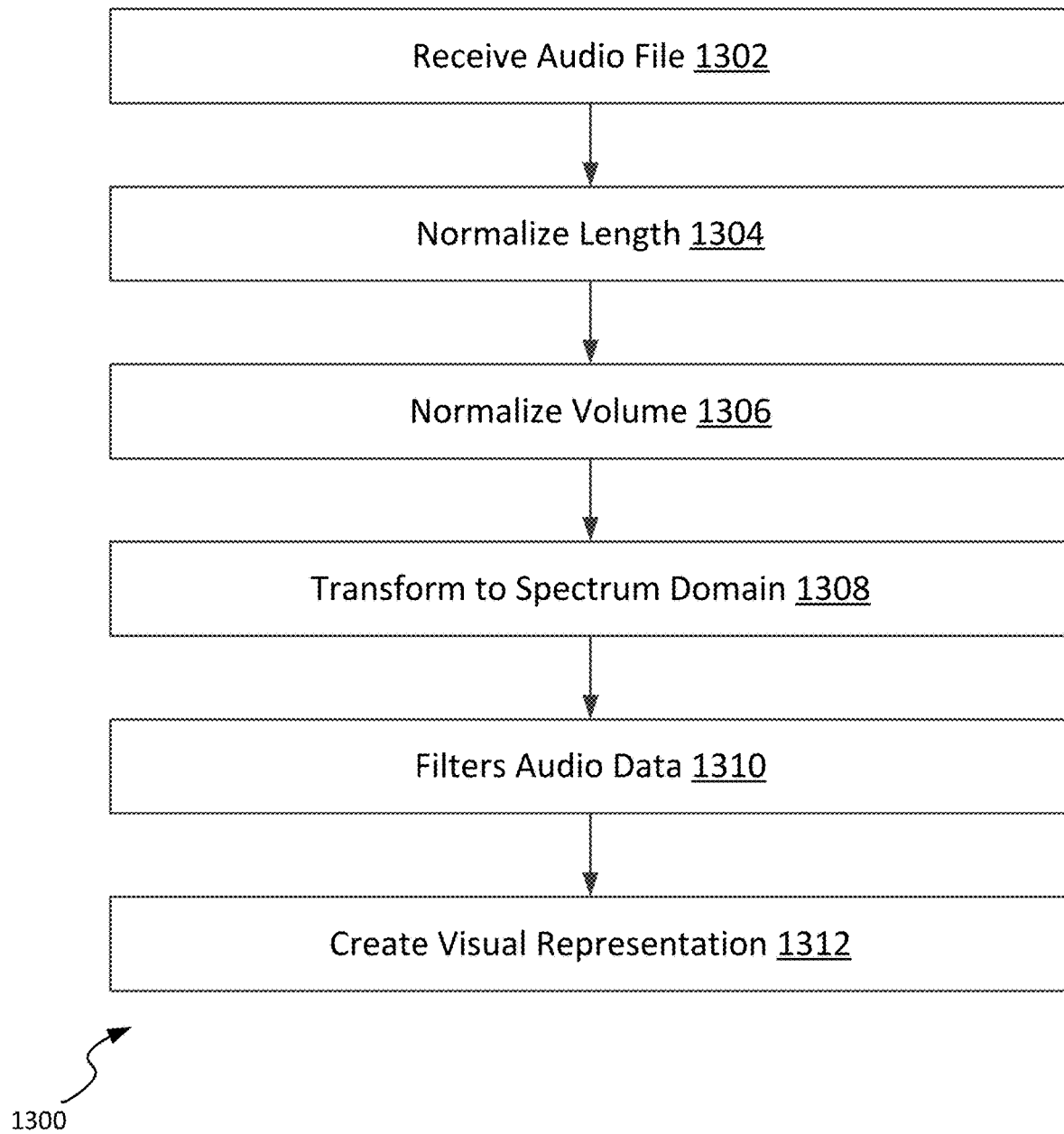
FIG. 13, is a flowchart method of processing an audio file, according to an example embodiment of the present disclosure.

Referring to FIGS. 11-12 generally, it is noted that the server-based processing methods described herein have a number of advantages over existing vehicle condition analysis tools, in particular when used in conjunction with the systems and apparatuses described above. For example, a vehicle condition inspector may quickly capture audio data of a vehicle and a vehicle identification number, provide that information to a server, and the server may perform a number of analyses on that data to determine features of an identifying characteristics of the vehicle being inspected. Accordingly, not only are improved vehicle audio data obtained, but suggested features may be presented to an inspecting user, simplifying their analysis of the vehicle condition. Furthermore, as models improve at accurately detecting features (as more training data becomes available), the importance that an inspector accurately identify all features of vehicle audio is lessened because the audio data analysis tools provided herein will identify such features based on the library of identified features and trained models. With respect to application users who are prospective bidders on the vehicle (consumers of vehicle condition reports), the features may, for example, be used to provide objective adjustments to vehicle value based on sales of other vehicles of the same make/model and having similar feature sets, which is information not typically exposed to such users. Other advantages are apparent as well throughout the application Referring to FIG. 13, a generalized method 1300 of processing vehicle audio data is described, according to an example embodiment. The method 1300 processes vehicle audio data before the audio data is used to train models or before audio data is used as an input in a trained model to predict vehicle engine conditions.

In the example shown, the method 1300 includes receiving an audio file (step 1302). In some embodiments the audio file may be uploaded from a mobile recording device. The method 1300 may optionally normalize the length of the audio file (step 1304). Methods of normalizing the audio files include by sample length equalization or representation size equalization. For example, the audio file may remove periods of time in the audio sample which do not include the desired captured sound. The method 1300 may optionally normalize the volume or signal amplitude of the audio file (step 1306). In some embodiments the audio file may be normalized to a volume or amplitude which is consistent with other processed audio files. The method 1300 may optionally transform the audio file to the spectrum domain (step 1308). The method 1300 may optionally filter the audio file (step 1310). Methods for filtering the audio data include using a Fast Fourier Transform (FFT), wavelets, or direct frequency filtering. Direct frequency filtering may include low pass, high pass, only looking at single bands etc. For example, a band-pass filter may be applied to mitigate the effects of wind and other external noises. Additionally, spectral gating may be performed, for example, based on a noise sample obtained from captured audio data corresponding to a time at which the vehicle engine is not running (e.g., before engine start). Mechanical filtering may be performed as well. In some embodiments the audio file is transformed to the spectrum domain and a filter is used to isolate frequencies of interest for detecting vehicle engine conditions. Filtering the audio file can also include removing frequencies from the audio data that are above or below a threshold magnitude. In general, very high frequency signals may typically be filtered as not originating from an engine, while lower-frequency signals (e.g., in the range of 0-24 kHz) may be of interest, and are therefore preserved for analysis.

Embodiments of processing the audio file may include machine learning algorithms to filter the audio file. For example, the audio file may be filtered with an algorithm which detects and removes voices from the recording. In some embodiments a user may select certain recording conditions of the audio and the audio processing method will adjust the filters applied. For example, a user could select that talking is heard in the audio sample, the audio sample has muffled sound, the audio sample is clipped, or the audio sample is noisy, then the audio processing will include a filter to address the audio sample issue. In other embodiments these conditions may automatically be detected from the audio sample.

Processing the audio file may also optionally include creating a visual representation of the audio file (step 1312). This step can include converting the audio data into a time domain waveform, spectrogram, Mel spectrogram, Mel-frequency cepstral coefficients (MFCCs) spectrogram, chromagram, etc. Examples of visual representations of audio data are also described in FIGS. 9, 10*a*, and 10B.

In some embodiments, segments will be detected as part of the audio processing method 1300. For example, the start segment may be detected by segmenting the audio file into root mean squared segments and selecting the peaks and valleys of each segment into a single order array. The start segment is then determined by searching the array for the first positive slope between a peak and valley.

The method 1300 can be performed, for example, at a computing device or a server such as computing devices 106, 122, 124, or 126, and server 110 of FIG. 1. The method 1300 can be performed as part of the audio processing engine 316. Creating a visual representation of the audio file (step 1212) can also be performed as part of the Visual representation generation component 320 described in FIG. 3.

Figure 14A:
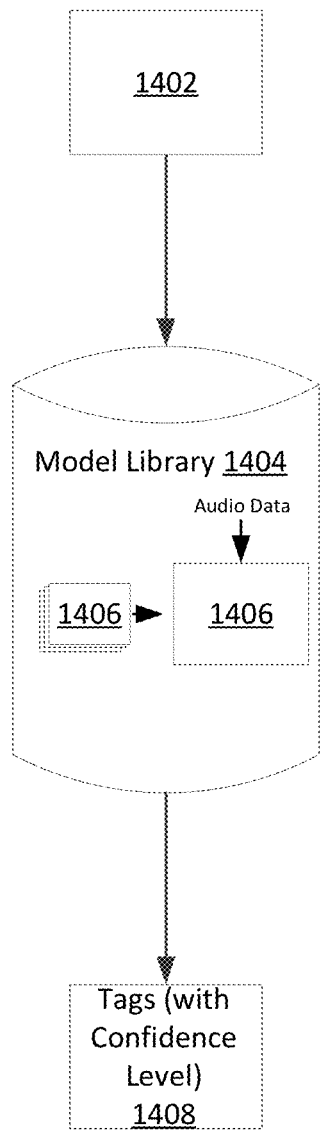
FIG. 14A-14B are flowchart representations of selecting one or more trained models, according to an example embodiment of the present disclosure.
Figure 14B:
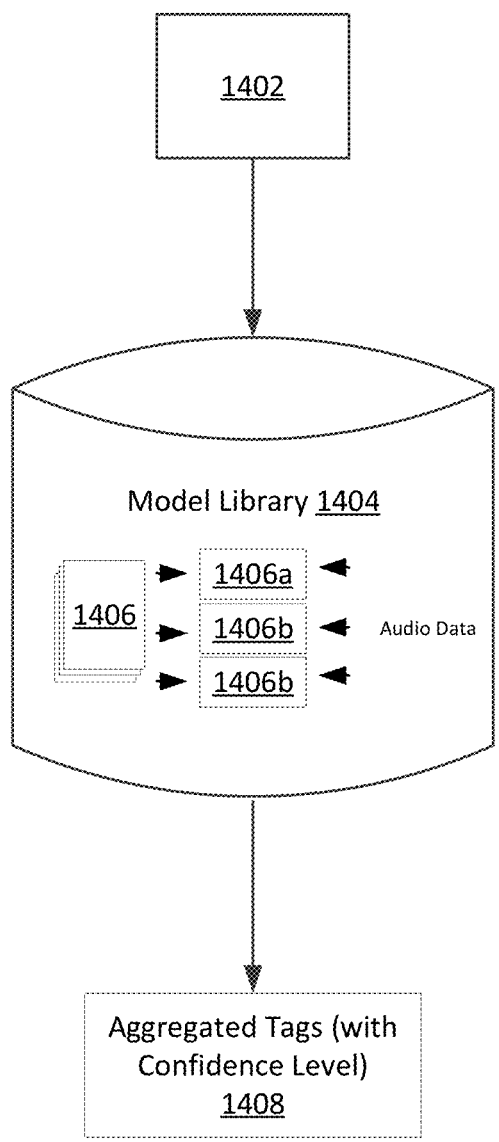

Referring now to FIGS. 14*a-b*, examples of possible model libraries 1030 in FIG. 11, and methods of selecting tags to be associated with a given audio file given the outputs of selected models are shown. Such structures are examples of structures to organize, select, and use trained models in database 1000 described in conjunction with FIG. 11.

In the example of FIG. 14A, a flowchart representation of selecting a trained model 1406 from the model library 1404 is shown. In this example, the model library 1404 is provided with a request for a trained model 1402 and accesses a trained model 1406 in the model library. The trained models 1406 detect one or more vehicle condition tags 1408 based on an audio recording of the vehicle engine.

The request for a trained model 1402 may include an audio file recording, vehicle engine identification information, and other features of the vehicle and the audio file. In some examples, the request 1402 does not contain vehicle identification information and the model library may access a general purpose model 1402 that is trained on a variety of vehicle models, make and year. In other embodiments vehicle identification information is automatically determined from the audio data file and the model library returns a trained model based on the determined vehicle classification information. In some embodiments the vehicle classification information is manually entered by a user and the model library provides a trained model based on the vehicle classification information.

The model library 1404 may contain one or more trained models 1406 as shown, and the trained models may have associated vehicle information. The model library 1404 may include one or more models trained on a wide variety of vehicle makes, models and years, and vehicle engine conditions. The trained model library 1404 can contain models trained on a wide variety of subsets or a complete set of audio file data. For example, some models may be based on only Toyota Camrys from 2007, while other models are based on all four door sedans or all 2007 Toyota vehicles. Additionally, a model may be based on all or almost all of the available audio file data which includes many different makes, models, and years of vehicles. When a request for a trained model 1402 is sent to the trained model library a trained model 1406 may be accessed based on provided or detected vehicle identification information. This allows the model library to select an appropriate model for detection of vehicle conditions and return of vehicle condition tags at an optimal level of specificity, given potential sparseness of data that may prevent an accurate model to be created for a particular combination of make, model, engine type, etc.

In a specific example, when a request for a trained model is made the model library will select the most relevant trained model. For example, if there is a model trained on audio data of 2007 Toyota Camrys with V6 engines and XLE trim and a request with the same vehicle identification information is made, then the trained model database will select the specific trained model. However, if there is not a specific trained model on 2007 Toyota Camrys the trained model may select a more general model, for example, a model trained on all 2007 four door sedans. In some examples there may not be a trained model that is associated with the input vehicle identification information and the model library may select a model trained on a set of audio files from many different models, makes, and years. In some embodiments a user may provide input to assist in selection of which trained model is used on the input audio file data.

Upon selection of a particular one or more trained models from the trained model database, the model may return data representative of one or more suspected vehicle conditions. The returned data may also include a confidence score returned in conjunction with each of the suspected vehicle conditions. Accordingly, in some embodiments, an audio file may be provided to a number of models, and the model (or models) that can identify engine conditions with a greatest level of confidence may be selected for use in generating tags associated with that audio file.

Additionally, in some optional embodiments, the confidence score for a given vehicle condition may be validated using one or more external data sources. For example, in some cases, the output of the model may be combined with information obtained from, e.g., OBD-II sensors in a way that might improve confidence that a particular condition is observed/detected.

Referring to FIG. 14B, a further flowchart representing selecting trained models from the trained model library is illustrated. In some examples the model library may select several trained models 1406*a-c* based on the vehicle identification information in the request. In some embodiments the model library may identify and select a trained model for a specific vehicle condition. For example, one trained model to detect an engine misfire and another trained model to detect a ticking noise. The model library may also return models which are trained on specific segments. For example the model library may return a model trained on the start segment, another model trained on a first segment where the engine is under load, another model on a second segment where the engine is under load, and another model on a stop segment, and so on. The trained model library may also select models trained with different subsets of vehicles for example one model could be trained on a specific vehicle which was submitted and another could be on a certain brand of vehicle in a certain year and another model may be based on a set of vehicle audio data which includes many vehicle makes, models, and years. Identified vehicle conditions may be aggregated from the outputs of those selected models when each model is provided with the audio file included in the request. Alternatively, fewer than all of the aggregated outputs may be selected (e.g., based on a request to identify a particular type of condition, or a request to identify only those conditions able to be identified with a high confidence level, or other methods of sub-selecting conditions that might otherwise be identified using the selected models 1406*a-c*.

In some embodiments, the particular level of granularity at which models may be trained and/or selected may be based, at least in part, on the extent to which training data is available for use. For example, if training data is available at the segmented make/model/year level, a comparatively more specialized (and accordingly, more accurate) model may be used. However, in other cases, a model based on a complete recording (non-segmented), or for a more general type of vehicle (e.g., non-year-specific, or more generally, only specific to a particular engine size/type) might be selected. In such circumstances, it is expected that confidence scores for particular detected conditions may be comparatively lower, and thresholds may be set accordingly to appropriately ensure that conditions are detected while avoiding over-detection of false positive conditions.

Figure 15:
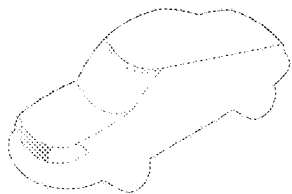
FIG. 15 illustrates a vehicle condition report, according to an example embodiment of the present disclosure.
Figure 15:
Figure 15:
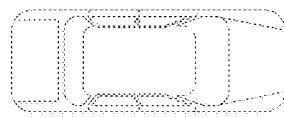

FIG. 15 illustrates an example representation of a vehicle condition report 1500. The vehicle condition report 1500 may be provided to, e.g., a vehicle inspector upon completion of his/her vehicle inspection, and may be viewable on a mobile device. For example, the vehicle condition report 1500 depicted in FIG. 15 may be generated by a computing device or a server such as computing devices 106, 122, 124, or 126, and server 110 of FIG. 1. For example, the vehicle condition report 1500 may be generated by the report generator 1106 described in FIG. 11.

In the embodiment shown, the vehicle condition report 1500 may include several fields providing vehicle information 1502. The vehicle information 1502 may include vehicle model, vehicle make, vehicle year, vehicle type, trim, engine, VIN. Miles, cost, seating type, vehicle color, cost, ownership records, maintenance records, etc. The vehicle information 1502 can include images of the interior and exterior of the vehicle. This can be based on, for example, information provided by a vehicle inspector at a time of inspection (e.g., entered using a mobile device 106 as seen in FIG. 1).

The vehicle report 1500 may include an Audio Motor Profile (AMP) 1504. In the example shown, the AMP 1504 corresponds to a user interface for displaying a visual representation of and/or playing an audio recording of the vehicle engine 1506. The AMP 1504 also may include, in some embodiments, a graphical depiction of one or more detected engine conditions 1508. The detected engine conditions can be displayed in association with a graphical depiction of the audio recording, and reflects various engine conditions which were detected in the audio recording. The AMP may also include a user interface selection which provides a detailed analysis of the audio data 1510.

Figure 16:
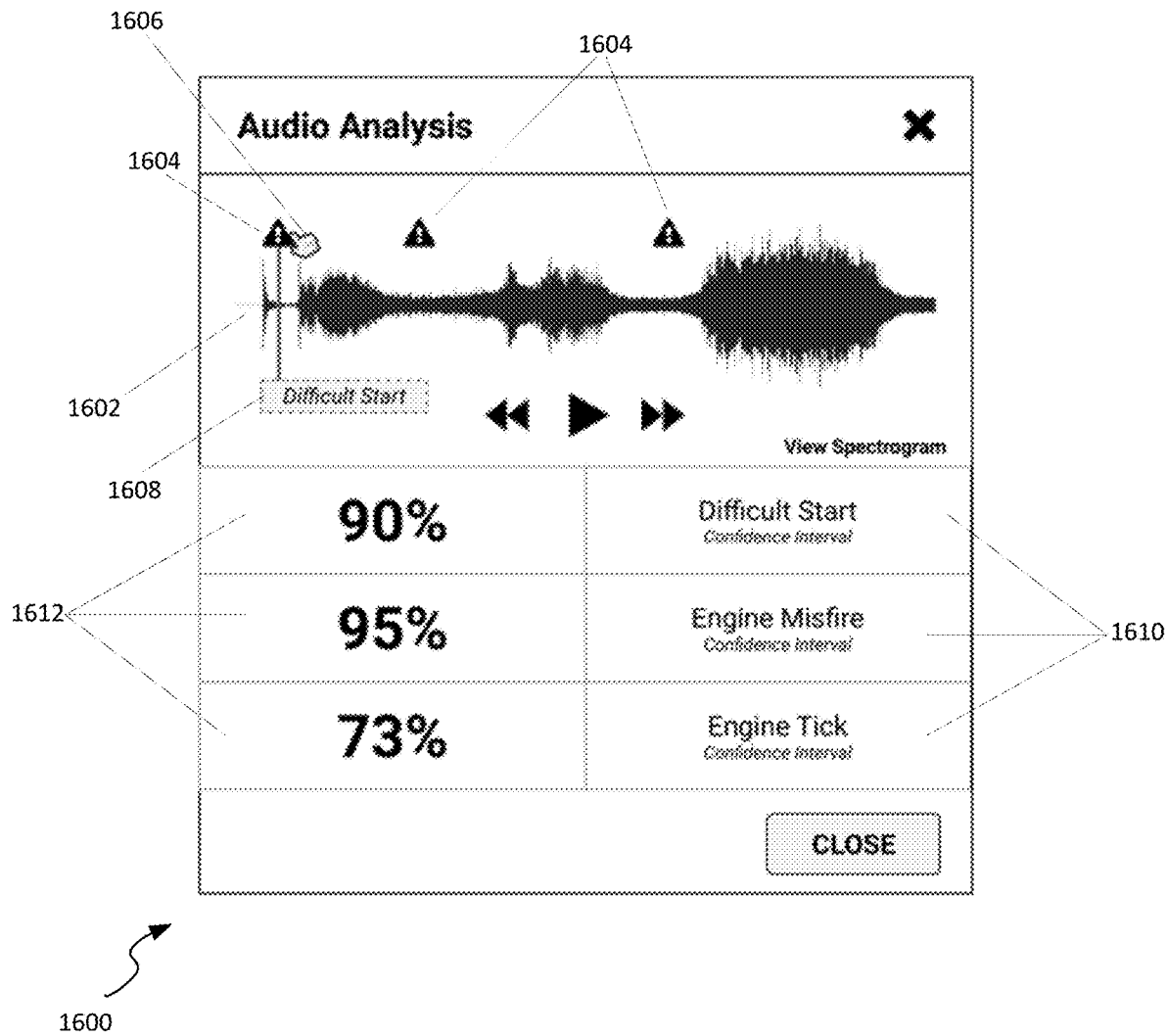
FIG. 16 illustrates an audio analysis report, according to an example embodiment of the present disclosure

In the example of FIG. 16, is a representation of a vehicle engine audio analysis report 1600. The vehicle engine audio analysis report 1600 may be presented to an inspecting user at a time of inspection, or may be used as an alternative representation of audio analysis to the portion of the vehicle condition report 1500 discussed above. In other embodiments, the audio analysis report may be a separate report. In particular embodiments, the vehicle engine audio analysis report 1600 may also be displayed when the "view detailed analysis" option 1510 is selected in the vehicle report 1500.

In the embodiment shown, the vehicle engine audio analysis report may include a visual representation of the engine audio data 1602. Examples of visual representations of engine audio data include time domain waveform, spectrogram, Mel spectrogram, Mel-frequency cepstral coefficients (MFCCs) spectrogram, chromagram, etc. The vehicle engine audio analysis report may include one or more engine warning indicators 1604. The engine warning indicators may indicate on the visual representation of the engine audio data where a particular engine condition was detected. In the example audio analysis report 1600, the engine warning indicator 1604 displays the detected condition 1308 when a user input indicator 1606 selects a warning indicator. In the example audio analysis report 1600, includes a list of detected engine conditions 1610 and corresponding confidence intervals 1612. The detected engine conditions 1610 include conditions which are detected in the audio data. The detected engine conditions may include throttle position, combustion, cylinder sequence, RPM-tachometer reading, engine misfire, stutter, air to gas ratio, as well as other conditions which may be indicative of engine performance loss. The associated confidence intervals 1612, provide an estimate on the probability of the associated vehicle engine condition. The confidence interval may determine if the audio sample relates closer to a known issue or no known issue.

The audio analysis report may allow for user input so a user can confirm or reject detected engine conditions. The audio analysis report may have two separate interfaces: one interface for authenticated inspectors which includes options for confirming detected conditions, and another interface for consumers of the vehicle engine audio analysis report 1600, which does not allow the user to confirm the detected engine conditions.

In some embodiments, once a detected engine condition is confirmed or denied, the audio file and confirmed condition tags can also be used for further training of the models associated with the particular type of vehicle that was inspected.

Example Aspects

In a first example aspect, a server computing device for providing vehicle condition reports includes a processor and a memory operatively connected to the processor and storing instructions which, when executed by the processor. The instructions cause the server computing device to: receive training audio files of recordings of vehicle engines, the training audio files including an audio recording of at least one known engine condition; train one or more models to predict the known engine condition using the received audio files and the at least one known engine condition, thereby creating one or more trained models; receive an audio file of a recording of a vehicle engine and vehicle identification information of the vehicle associated with the vehicle engine; perform pre-processing of the audio file, the pre-processing including one or more of (1) normalizing length, volume or amplitude of an audio signal included in the audio file, and (2) filtering noise from the audio file; select a trained model from among the one or more trained models based, at least in part, on the vehicle identification information; obtain one or more predicted condition tags and associated confidence values based on output of the model; and generate a vehicle condition report including a representation of the audio file and at least one of the one or more predicted condition tags.

In a further example, the server computing device of the first example is further modified in that the server computing device includes a database including a plurality of trained models maintained in a model library, and wherein the server computing device is configured to select a trained model from the database based on the vehicle identification information.

In a further example, the server computing device of the first example is further modified in that the processor is further configured to, in response to receiving a request for the vehicle condition report from a remote computing device, provide the vehicle condition report including the representation of the audio file and the at least one predicted condition tag to the remote computing device.

In a further example, the server computing device of any preceding example is further modified in that the audio files are received from a mobile inspection device, wherein the remote computing device is a different computing device as compared to the mobile inspection device.

In a further example, the server computing device of any preceding example is further modified in that the processor is further configured to identify a location which corresponds to the at least one predicted condition tag in the visual representation of the audio file and send the visual representation, including a visual representation of the tag located at the location, to the remote computing device.

In a further example, the server computing device of any preceding example is further modified in that it includes a database storing a plurality of trained models and the processor is further configured to select a trained model from the database based on the one or more segments.

In a further example, the server computing device of any preceding example is further modified in that the processor further selects the trained model from the database based on the vehicle identification information.

In a still further example, a method of capturing and processing audio includes: receiving vehicle identification information; placing a mobile device configured to capture audio in a digital format and including at least one microphone in proximity to a vehicle; initiating audio capture using the mobile device and microphone; starting the vehicle engine while the mobile device is capturing audio; idling the engine while the mobile device is capturing audio; placing the engine under varying power potential while the mobile device is capturing audio; stopping the engine; ending audio capture and storing the digitally captured audio in an audio file; tagging the audio file with information related to conditions during audio capture; associating the vehicle identification information with the audio file; uploading the audio file to a remote computing device for processing of the audio file.

In a further example, the method of the preceding example is further modified in that it can include confirming a detected condition within a visual representation of the captured audio.

In a further example, any preceding method example is further modified in that the visual representation of the captured audio comprises a Mel power spectrogram.

In a further example, any preceding method example is further modified in that the method can include: at the remote computing device, automatically detecting one or more features in the visual representation of the captured audio; at the remote computing device, automatically identifying the locations of the one or more features in the visual representation of the captured audio; and displaying, via the mobile device, the one or more identified locations in the visual representation of the captured audio.

In a further example, a method of predicting conditions of a vehicle engine can include receiving an audio file recording of the vehicle engine; receiving vehicle identification information of a vehicle associated with the vehicle engine; deriving one or more tags identifying vehicle conditions observed in the audio file using one more models trained on audio files associated with other vehicles; and generating one or more predicted condition tags associated with the audio file.

The method of predicting conditions of a vehicle engine may further include selecting the one or more models based on the vehicle identification information. Additionally, the other vehicles may be analogous vehicles to the vehicle engine.

In a further example, the example method of predicting conditions can be further modified in that at least one of the models is associated with a tag identifying a vehicle condition.

In a further example, the preceding example methods of predicting conditions can be further modified in that they can include generating a display including each of the one or more predicted condition tags in association with a confidence score.

In a further example, the preceding example methods of predicting conditions can be further modified in that the one or more features are selected from a group of features consisting of: ambient noise recorded before engine start, engine start, engine idling, engine under load, engine shut off, abnormalities during the periods of time encompassed by any of the engine start, engine idling, engine under load, and engine shut off events.

In a further example, the preceding example methods of predicting conditions can be further modified in that they may further include normalizing at least one of a length and a volume of the audio file; filtering noise from the audio file; and segmenting the audio file into a plurality of audio segments for analysis.

In a further example, preceding example methods of predicting conditions can be further modified in that they may include selecting one or more models associated with each segment of the plurality of segments of the audio file, and generating a visual representation of the audio file.

In a further example, the preceding example methods of predicting conditions can be further modified in that they may include identifying locations of the one or more features which correspond to the tags in the visual representation of the audio file; and displaying the one or more identified locations in the visual representation of the captured audio.

In a further example, a vehicle audio capture system includes a mobile device configured to capture vehicle engine sounds in an audio file and to associate tags identifying one or more vehicle conditions observed during audio capture and reflected in the audio file and a server communicatively accessible by the mobile device. The server is configured to process the audio file and expose an application programming interface (API) to provide access to the audio file to one or more data consumer devices.

In a further example, the vehicle audio capture system can be further modified in that it may include a vibration resistant and anti-slip mobile device case including a microphone communicatively connectable to the mobile device during capture of the vehicle engine sounds.

In further examples, the vehicle audio capture system can be further modified in that it may include a condition report server configured to access the application programming interface to retrieve a version of the audio file and include data describing the audio file within a vehicle condition report. The server may be further configured to include the audio data in a vehicle condition report. The condition report server may further configured to generate a visual representation of the captured audio. Additionally, the data describing the audio file includes one or more tags associated with the audio file.

In further examples, the vehicle audio capture system can be further modified in that it may include a plurality of mobile devices configured to capture vehicle engine sounds.

In further examples, the vehicle audio capture system can be further modified in that the server is configured to process the audio file by analyzing the audio file with reference to audio files of analogous vehicles to identify a location within the audio file corresponding to one or more conditions of the vehicle.

In further examples, the vehicle audio capture system can be further modified in that analyzing the audio file comprises extracting one or more features from the audio file using a trained model. The trained model may comprise a neural network. The one or more features are selected from a group of features consisting of: ambient noise recorded before engine start, engine start, engine idling, engine under load, engine shut off, abnormalities during the periods of time encompassed by any of the engine start, engine idling, engine under load, and engine shut off events. Additionally, the trained model is selected from a model library, the trained model being trained using audio files associated with a particular make, model, and year of the vehicle.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A system for identifying at least one condition of an engine of a vehicle from an audio recording of the engine captured during its operation, the system comprising:
    at least one processor; and
    a non-transitory computer-readable storage medium storing processor-executable instructions that, when executed by the at least one processor, cause the at least one processor to perform:
    obtaining, using at least one microphone, an audio recording of the engine during operation of the engine in a plurality of engine operation segments;
    obtaining metadata related to the audio recording, the metadata including a vehicle identification number of the vehicle containing the engine;
    transmitting, via a communication network, the audio recording and the vehicle identification number to at least one computer for processing to identify any engine condition and associated confidence value;
    receiving, via the communication network, information indicating one or more engine conditions, including a first engine condition, and corresponding one or more confidence values, including a first confidence value for the first engine condition, the first confidence value being indicative of a probability that the first engine condition was detected in the audio recording of the engine;
    displaying a visual representation of the audio recording together with one or more engine warning indicators indicating, on the visual representation of the audio recording, where the one or more engine conditions were detected; and
    in response to selection of a first of the one or more engine warning indicators, showing an indication of the corresponding engine condition.

2. The system of claim 1, further comprising a mobile device, wherein the microphone is integrated into the mobile device.

3. The system of claim 2, wherein the receiving, via the communication network, the information indicating the one or more engine conditions is performed by the mobile device.

4. The system of claim 2, wherein the receiving, via the communication network, the information indicating the or more engine conditions is performed by a second mobile computing device.

5. The system of claim 2, wherein the metadata further includes user tags selected by a user of the mobile device and wherein the processor-executable instructions further cause the at least one processor to perform:
    transmitting, via the communication network, the user tags along with the audio recording and the vehicle identification number.

6. The system of claim 5, wherein the user tags indicate conditions associated with the capture of the audio recording.

7. The system of claim 6, wherein the user tags indicate user judgements of vehicle engine sounds during the capture of the audio recording.

8. The system of claim 6, wherein the user tags indicate user observations of sounds captured in the audio recording which were produced by ancillary components, wherein the sounds captured which were produced by the ancillary components are selected from a group consisting of: a compressor of a radiator of a turbo, pumps, chains, pulleys, and ball bearings.

9. A method for identifying at least one condition of an engine of a vehicle from an audio recording of the engine captured during its operation, the method comprising:
    obtaining, using at least one microphone, an audio recording of the engine during operation of the engine in a plurality of engine operation segments;
    obtaining metadata related to the audio recording, the metadata including a vehicle identification number of the vehicle containing the engine;
    transmitting, via a communication network, the audio recording and the vehicle identification number to at least one computer for processing to identify one or more engine conditions and associated confidence values;
    receiving, via the communication network, information indicating one or more engine conditions, including a first engine condition, and corresponding one or more confidence values, including a first confidence value for the first engine condition, the first confidence value being indicative of a probability that the first engine condition was detected in the audio recording of the engine;
    displaying a visual representation of the audio recording together with one or more engine warning indicators indicating, on the visual representation of the audio recording, where the one or more engine conditions were detected; and
    in response to selection of a first of the one or more engine warning indicators, showing an indication of the corresponding engine condition.

10. The method of claim 9, wherein the engine performs, during the plurality of engine operation segments, a corresponding plurality of operations, wherein the audio recording comprises segments ordered in a sequence corresponding to the sequence in which the plurality of operations were performed by the engine during capture of the audio recording, and wherein the corresponding plurality of operations comprise at least 2 operations selected from a group of features consisting of: ambient noise recorded before engine start, engine start, engine idling, engine under load, engine shut off, abnormalities during the periods of time encompassed by any of the engine start, engine idling, engine under load, and engine shut off events.

11. A system for identifying at least one condition of an engine of a vehicle from an audio recording of the engine captured during its operation, the system comprising:
    at least one processor;
    a non-transitory computer-readable storage medium storing processor-executable instructions that, when executed by the at least one processor, cause the at least one processor to perform:
    receiving, via a communication network, an audio recording of the engine of the vehicle captured during operation of the engine in a plurality of engine operation segments sounds and a vehicle identification number for the vehicle;

processing the audio recording of the engine using at least one machine learning model to obtain an output indicating at least one engine condition and a corresponding at least one confidence value indicative of at least one probability that the at least one engine condition is detected in the audio recording of the engine;

displaying a visual representation of the audio recording together with one or more engine warning indicators indicating, on the visual representation of the audio recording, where the one or more engine conditions were detected; and in response to selection of a first of the one or more engine warning indicators, showing an indication of the corresponding engine condition.

12. The system of claim 11, wherein the engine performs, during the plurality of engine operation segments, a corresponding plurality of operations wherein the audio recording comprises segments ordered in a sequence corresponding to the sequence in which the plurality of operations were performed by the engine during capture of the audio recording.

13. The system of claim 12, wherein the corresponding plurality of operations comprise at least 2 operations selected from a group consisting of: ambient noise recorded before engine start, engine start, engine idling, engine under load, engine shut off abnormalities during the periods of time encompassed by any of the engine start, engine idling, engine under load, and engine shut off events.

14. The system of claim 13, wherein the corresponding plurality of operations comprise at least 3 operations selected from the group consisting of: ambient noise recorded before engine start, engine start, engine idling, engine under load, engine shut off abnormalities during the periods of time encompassed by any of the engine start, engine idling, engine under load, and engine shut off events.

15. The system of claim 14, wherein the corresponding plurality of operations comprise at least 4 operations selected from the group consisting of: ambient noise recorded before engine start, engine start, engine idling, engine under load, engine shut off abnormalities during the periods of time encompassed by any of the engine start, engine idling, engine under load, and engine shut off events.

16. The system of claim 15, wherein the corresponding plurality of operations comprise at least 5 operations selected from the group consisting of: ambient noise recorded before engine start, engine start, engine idling, engine under load, engine shut off abnormalities during the periods of time encompassed by any of the engine start, engine idling, engine under load, and engine shut off events.

17. The system of claim 12, wherein the sequence of engine operation segments comprises at least 2 operations selected from the group consisting of: engine start, engine idling, engine under load, and engine shut.

18. The system of claim 17, wherein the sequence of engine operation segments comprises at least 3 operations selected from the group consisting of: engine start, engine idling, engine under load, and engine shut.

19. The system of claim 11, wherein the processor-executable instructions further cause the at least one processor to perform:

segmenting the audio recording of vehicle engine sounds into a plurality of audio segments.

20. The system of claim 19, wherein the processor-executable instructions further cause the at least one processor to perform:

providing the plurality of audio segments to the at least one machine learning model for processing.

21. A method for identifying at least one condition of an engine of a vehicle from an audio recording of the engine captured during its operation, the method comprising:

receiving, via a communication network, an audio recording of the engine of the vehicle captured during operation of the engine in a plurality of engine operation segments and a vehicle identification number for the vehicle;

processing the audio recording of the engine using at least one machine learning model to obtain an output indicating at least one engine condition and a corresponding at least one confidence value indicative of at least one probability that the at least one engine condition is detected in the audio recording of the engine;

displaying a visual representation of the audio recording together with one or more engine warning indicators indicating, on the visual representation of the audio recording, where the one or more engine conditions were detected; and in response to selection of a first of the one or more engine warning indicators, showing an indication of the corresponding engine condition.

22. The method of claim 21, wherein the engine performs, during the plurality of engine operation segments, a corresponding plurality of operations wherein capture of the audio recording of vehicle engine sounds occurs through a defined sequence of engine operation segments, and wherein the corresponding plurality of operations comprise at least 2 operations selected from a group of features consisting of: ambient noise recorded before engine start, engine start, engine idling, engine under load, engine shut off, abnormalities during the periods of time encompassed by any of the engine start, engine idling, engine under load, and engine shut off events.

* * * * *